(12) United States Patent
Nakai

(10) Patent No.: US 9,452,361 B2
(45) Date of Patent: Sep. 27, 2016

(54) NETWORK GAME SYSTEM

(75) Inventor: Hitoshi Nakai, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 832 days.

(21) Appl. No.: 10/870,144

(22) Filed: Jun. 18, 2004

(65) Prior Publication Data

US 2004/0224774 A1 Nov. 11, 2004

Related U.S. Application Data

(62) Division of application No. 10/028,311, filed on Dec. 28, 2001, now abandoned.

(30) Foreign Application Priority Data

Dec. 28, 2000 (JP) .................................. 2000-401236

(51) Int. Cl.

| | |
|---|---|
| *A63F 9/24* | (2006.01) |
| *A63F 13/48* | (2014.01) |
| *A63F 13/795* | (2014.01) |
| *A63F 13/30* | (2014.01) |
| *A63F 13/35* | (2014.01) |

(Continued)

(52) U.S. Cl.
CPC ............... *A63F 13/48* (2014.09); *A63F 13/12* (2013.01); *A63F 13/35* (2014.09); *A63F 13/795* (2014.09); *A63F 13/332* (2014.09); *A63F 13/822* (2014.09); *A63F 2300/406* (2013.01); *A63F 2300/636* (2013.01); *A63F 2300/807* (2013.01)

(58) Field of Classification Search
CPC .................... A63F 2300/50; A63F 2300/556; A63F 2300/572; H04L 12/581

USPC ........................................................ 463/42
See application file for complete search history.

(56) References Cited

U.S. PATENT DOCUMENTS

| | | |
|---|---|---|
| 5,379,340 A | 1/1995 | Overend et al. |
| 6,106,395 A | 8/2000 | Begis |

(Continued)

FOREIGN PATENT DOCUMENTS

| | | |
|---|---|---|
| JP | 57-172440 | 10/1982 |
| JP | 1-250228 | 10/1989 |

(Continued)

OTHER PUBLICATIONS

Title (http//en.wikipedia.org/wiki/Titles) Retrieved on 12th Jan. 2009.*

(Continued)

*Primary Examiner* — David L Lewis
*Assistant Examiner* — Robert Mosser
(74) *Attorney, Agent, or Firm* — Nixon & Vanderhye PC

(57) ABSTRACT

A network game system includes a game server in which a plurality of players respectively operating a plurality of portable communication terminals are registered in advance. When any one of the players logs in the game server through a communication network, a game is supplied to the portable communication terminal of the player. A game screen is shown on a display, and both characters in the course of logging-in and logging out are displayed on the game screen. If the player selects the logging-out character, a selection signal is transmitted to the game server. The game server transmits a log-in operation request to the portable communication terminal of the player operating the selected character.

38 Claims, 35 Drawing Sheets

(51) Int. Cl.
    *A63F 13/332*     (2014.01)
    *A63F 13/822*     (2014.01)

(56) References Cited

U.S. PATENT DOCUMENTS

| | | | |
|---|---|---|---|
| 6,167,426 | A | 12/2000 | Payne et al. |
| 6,168,524 | B1 | 1/2001 | Aoki et al. |
| 6,264,562 | B1 | 7/2001 | McSheffrey et al. |
| 6,406,371 | B1 | 6/2002 | Baba et al. |
| 6,416,414 | B1 | 7/2002 | Stadelmann |
| 6,446,118 | B1 | 9/2002 | Gottlieb |
| 6,449,344 | B1 | 9/2002 | Goldfinger et al. |
| 6,512,930 | B2 | 1/2003 | Sandegren |
| 6,587,691 | B1 | 7/2003 | Granstam et al. |
| 6,692,359 | B1 * | 2/2004 | Williams et al. ............ 463/42 |
| 2002/0086732 | A1 * | 7/2002 | Kirmse et al. ............ 463/42 |

FOREIGN PATENT DOCUMENTS

| | | |
|---|---|---|
| JP | 5-274267 | 10/1993 |
| JP | 06-102855 | 4/1994 |
| JP | 8-47582 | 2/1996 |
| JP | 8-98956 | 4/1996 |
| JP | 8-129535 | 5/1996 |
| JP | 8-155145 | 6/1996 |
| JP | 09-016487 | 1/1997 |
| JP | 09-034685 | 2/1997 |
| JP | 09-164271 | 6/1997 |
| JP | 10-057628 | 3/1998 |
| JP | 10-295939 | 11/1998 |
| JP | 11-319319 | 11/1999 |
| JP | 2000-325657 | 11/2000 |
| JP | 2001-273255 | 10/2001 |
| WO | WO 98/16045 | 4/1998 |
| WO | WO 99/08434 | 2/1999 |
| WO | WO 00/44458 | 8/2000 |

OTHER PUBLICATIONS

Documents related to ICQ instant message system, "ICQ 2000b Beta verschickt jetzt auch SMS", Sep. 22, 2000, 1 page, http://www.golem.de/0009/9923.html.

A. Eschenburg, "Wo laufen sie denn?", Report Chatsysteme, 1998, Hett 22, pp. 92-95.

ICQ Documentation Packet, Aug. 2000, Accessed through http://web.archive.org/web/*/http:/www.icq.com.

The History of Electronic Mail, circa 1974, http://www.multicians.org/thvv/mail-history.html.

Offline messages?, Oct. 1999, http://www.imppwg.org/ml-archive/IMPP-WG/199910msg00240.html.

AOL Instant Messenger, Aug. 2000, http://web.archive.org/web/20000816021533/http://www.aol.com/aim/faq/email.html.

Nov. 11, 2010 Summons to Attend Oral Proceedings issued in corresponding European Patent Application No. 01310929.3, 6 Pages.

Sep. 3, 2011 Brief Communication issued in corresponding European Patent Application No. 01310929.3, 3 Pages.

EverQuest Manual Supplement, Mar. 1999 (with Annex), 26 Pages.

* cited by examiner

FIG. 47

```
        Online
        Game

START GAME
  CHANGE RECEPTION MODE
       RETURN
```

FIG. 48

| PRAIRIE | |
|---|---|
| NINTEN | |
| ROBIN | SLEEPING |
| WILL | |
| MARIAN | |
| JOHN | |
| MOVE | SEARCH |
| SETTING | END |

FIG. 49

| MOVE | |
|---|---|
| PRESENT LOCATION : PRAIRIE | |
| NORTH: | SELVA'S FOREST |
| SOUTH: | ORLEANS TOWN |
| WEST: | NORD WETLAND |
| EAST: | Mt. BORHOKO |
| RETURN | |

FIG. 50

| ROBIN | MALE |
|---|---|
| STATE | SLEEPING |
| PROFILE | |
| TRAVELING IN SEARCH OF LEGENDARY SWORD. JOIN ME IF YOU ARE NORTHBOUND. WAKE ME UP ANYTIME. | |
| WAKE-UP | RETURN |

FIG. 51

```
       Online Game

NINTEN IS
    WAKING YOU UP

START GAME
     NOT PLAY NOW
   SET TO PROHIBIT CALL
```

NETWORK GAME SYSTEM

This application is a divisional of application Ser. No. 10/028,311, filed Dec. 28, 2001, now abandoned, which claims priority to Japanese Application No. 2000-401236, filed Dec. 28, 2000, the entire content of each of which is hereby incorporated by reference in this application.

BACKGROUND OF THE INVENTION

1. Field of the Invention

The present invention relates to a game management method of a game server which provides a game for a game apparatus of a player who have logged in through a communication network, or relates to a game apparatus, a game server, a game program, and a storing medium applied to a game utilizing the communication network.

2. Description of the Prior Art

With respect to a multiplayer-participating-type RPG (Role Playing Game) which utilizes internet, Ultima Online provided by Electronic Arts Square is well known. In such the multiplayer-participating-type RPG, a game map and player character data are provided on a game server on the internet, and a virtual space in which his own player character appear is reproduced on a display of a client computer owned by a person who logged in the game server. In the virtual space, another player character is also appearing, and the player character is operated by another client computer. In this manner, since each player character appearing in the virtual space is operated by the client computer, it is possible to enjoy a real maneuvering which could not be experienced with a stand-alone RPG.

In the prior art, however, only the player characters logging-in the game server are appearing in the virtual space. Due to this, in order to play a game with a player character not logging-in the game server, there was a necessity of either selecting a non-real time method such as filling out on a message board provided in the game or utilizing a communication method in a real-space such as making a phone call. Therefore, it was time consuming in starting the game. In addition, in such the game as in the prior art, there were many players who did not wish to be acquainted with an opponent in the real-space even though each player took a role as a friend in the game. Therefore, it was not possible to make a telephone communication with such the player.

It is a fact that one of pleasures in the multiplayer-participating-type game is to be able to meet persons who have a common interest. However, in the prior system, it is only possible to find a new friend out of players logging-in at that time. Of course, it is possible to meet a new person who has a common interest by resorting to such a method as leaving a message on the message board, "Those interested in OOO, come and join me at XX to ΔΔ." In this case, it is not only inflexible because of a need of making an infallible access at an agreed-upon time, but also was there a necessity to allow a plenty of time for the opponent to read the message ever since the message was filled out on the message board. Due to this, there was a problem that it took time until it becomes possible to enjoy a game with an intended opponent.

SUMMARY OF THE INVENTION

Therefore, a primary object of the present invention is to provide a novel game management method, a game server, a game apparatus, a game program and storing medium.

Another object of the present invention is to provide a game management method capable of simply and promptly playing a game between a player logging-in a game server and a player not logging-in the game server.

Still another object of the present invention is to provide a game server allowing a logging-in player to simply and promptly play a game with non logging-in player.

Yet still another object of the present invention is to provide a game apparatus allowing to simply and promptly play a game with a player not logging-in the game server.

Another object of the present invention is to provide a game program capable of simply and promptly playing a game between a player logging-in a game server and a player not logging-in the game server.

Still another object of the present invention is to provide a storing medium storing a game program capable of simply and promptly playing a game between a player logging-in a game server and a player not logging-in the game server.

According to the present invention, a game management method of a game server which provides a game for a first game apparatus of a first player who has logged-in through a communication network out of a plurality of players who are previously registered, comprises steps of: (a) transmitting to the first game apparatus player information representing a second player who does not log-in cut of the plurality of players; and (b) transmitting a log-in operation request to a second game apparatus of the second player upon receipt of a first selection signal which represents a selection of the second player from the first game apparatus.

According to the present invention, a game server which provides a game for a first game apparatus of a first player who has logged-in through a communication network out of a plurality of players who are previously registered, comprises: a first transmission means for transmitting to the first game apparatus player information representing a second player who does not log-in out of the plurality of players; and a second transmission means for transmitting a log-in operation request to a second game apparatus of the second player upon receiving from the first game apparatus a selection signal which represents a selection of the second player.

A plurality of players are previously registered on the game server, and the game server provides a game for the first game apparatus of the first player who logged-in through the communication network. At this time, the game server transmits to the first game apparatus the player information representing the second player who has not logged-in, and transmits to the second game apparatus of the second player the log-in operation request when receiving from the first game apparatus a first selection signal which represents a selection of the second player. Due to a fact that the player information is transmitted to the first game apparatus, it is possible to easily identify the second player who does not log-in by the first game apparatus. Herein, if the second player is selected by the first player, the first selection signal is applied to the game server from the first game apparatus, and the log-in operation request is transmitted to the second game apparatus from the game server. That is, the second player is invited from the first player to take part in a game. Therefore, it is possible to simply and promptly play the game between the first player and the second player.

In a certain aspect of the present invention, each player can register in the game server first transmission information which uniformly permits/prohibits a transmission of the log-in operation request. When the first transmission information of the second player shows a prohibition, the came server sends back a first message to the first game apparatus without transmitting the log-in operation request to the second game apparatus.

In another aspect of the present invention, each player can register in the game server second transmission information which permits/prohibits a transmission of the log-in operation request depending upon each player. When the second transmission information of the second player shows a prohibition on the first player, the game server sends back the first message to the first came apparatus without transmitting the log-in operation request to the second game apparatus.

In still another aspect of the present invention, the game server sends back the second message to the first game apparatus when a log-in operation denial is sent back from the second game apparatus toward the log-in operation request.

It is noted that it may be possible to include identification information capable of specifying the first player in the log-in operation request.

In yet still another aspect of the present invention, each player can register personal information in the game server. The game server sends back the personal information of the second player to the first game apparatus when receiving from the first game apparatus the second selection signal which represents a selection of the second player.

In another aspect of the present invention, the game server reads from a memory a first character signal representing a first character operated by the first player, a second character signal representing a second character operated by the second player and a third character signal representing a third character operated by a third player who has already logged-in at a time of the first player's logging-in, adds the player information to the second character signal, and transmits to the first game apparatus the first character signal, the second character signal to which the player information is added and the third character signal. The second character is displayed on the first game apparatus in such a manner as to be different from the first character and the third character.

According to the present invention, a game program product allowing a game apparatus operated by a player logging-in a game server through a communication network to execute, comprises steps of: (a) receiving from the game server player information representing a specific player who is previously registered and does not log-in the game server when logging-in the game server; (b) guiding a selection of the specific player based on the player information; (c) requesting the game server to transmit a log-in operation request to the specific player when the specific player is selected; and (d) guiding a log-in operation in receipt of the log-in operation request from the game server while not logging-in the game server.

According to the present invention, a game apparatus operated by a player who logged-in a game server through a communication network, comprises: a player information receiving means for receiving from the game server player information representing a specific player who is previously registered and does not log-in the game server when logging-in the game server and; a first guiding means for guiding a selection of the specific player based on the player information; a requesting means for requesting the game server to transmit a log-in operation request to the specific player when the specific player is selected; and a second guiding means for guiding a log-in operation upon receipt of the log-in operation request from the game server while not logging-in the game server.

According to the present invention, a storing medium storing a game program allowing a game apparatus operated by a player logging-in a game server through a communication network to execute, wherein said game program comprises steps of: (a) receiving from the game server player information representing a specific player who is previously registered and does not log-in the game serve: when logging-in the game server; (b) guiding a selection of the specific player based on the player information; (c) requesting the specific player to transmit a log-in operation request to the game server when the specific player is selected; and (d) guiding a log-in operation upon receipt of the log-in operation request from the game server while not logging-in the game server.

By operating the game apparatus, the player is logged-in the game server through the communication network. Upon logging-in the game server, the player information previously registered and representing a specific player who does not log-in the game server is transmitted from the game server, and the selection of the specific player is guided based upon the player information. If the specific player is selected, a transmission request of the log-in operation request to the specific player is transmitted to the game server. A game apparatus not logging-in the game server guides the log-in operation when receiving the log-in operation request from the game server. That is, when the specific player is selected in the logging-in game apparatus, the log-in operation request is applied to the game apparatus of the specific player. Therefore, it is possible for a player who has logged-in to simply and promptly play a game with a player who does not log-in.

In a certain aspect of the present invention, a character of the specific player is displayed on a game screen based on the player information, and a predetermined operation is guided toward the displayed character. If the predetermined operation is carried out toward such the specific player, a transmission of the log-in operation request is requested to the game server.

In another aspect of the present invention, the log-in operation request includes request source identification information. When guiding the log-in operation, identification information is detected from the log-in operation request, and a guide message specifying the request source is outputted based on the identification information in question.

In still another aspect of the present invention, if a denial operation is carried out toward a guide of the log-in operation, a transmission of denial message information is requested to the game server. When receiving the denial message information from the game server, a denial message is outputted.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 47 is an illustrative view showing one example of a game menu screen displayed on the portable communication terminal in another embodiment of the present invention;

FIG. 48 is an illustrative view showing one example of a game screen displayed on the portable communication terminal in another embodiment of the present invention;

FIG. 49 is an illustrative view showing one example of a destination moving menu screen displayed on the portable communication terminal in another embodiment of the present invention;

FIG. 50 is an illustrative view showing one example of a personal information screen displayed on the portable communication terminal in another embodiment of the present invention; and FIG. 51 is an illustrative view showing one example of a calling screen displayed on the portable communication terminal in another embodiment of the present invention.

DETAILED DESCRIPTION OF THE PREFERRED EMBODIMENTS

Figure 1:
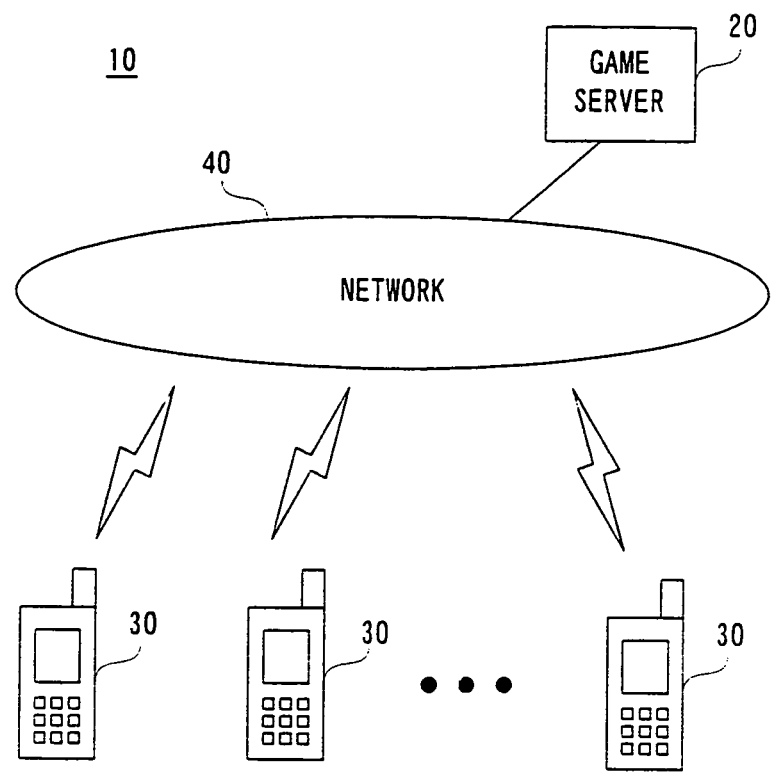
FIG. 1 is an illustrative view showing one embodiment of the present invention.

Referring to FIG. 1, a network game system 10 in this embodiment includes a game server 20 which is constantly wire-connected to a communication network 40, and a plurality of portable communication terminals 30, 30, . . . which are wireless-connected, if required, to the communication network 40. When a player already registered in the game server 20 logs-in the game server 20 by operating his own portable communication terminal 30, the game server 20 provides a game for the portable communication terminal 30 of the log-in player. By doing this, it becomes possible to play the game among the log-in players.

Figure 2:
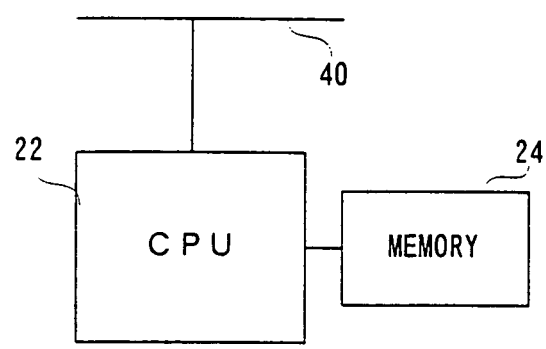
FIG. 2 is a block diagram showing one example of a configuration of a game server.
Figure 3:
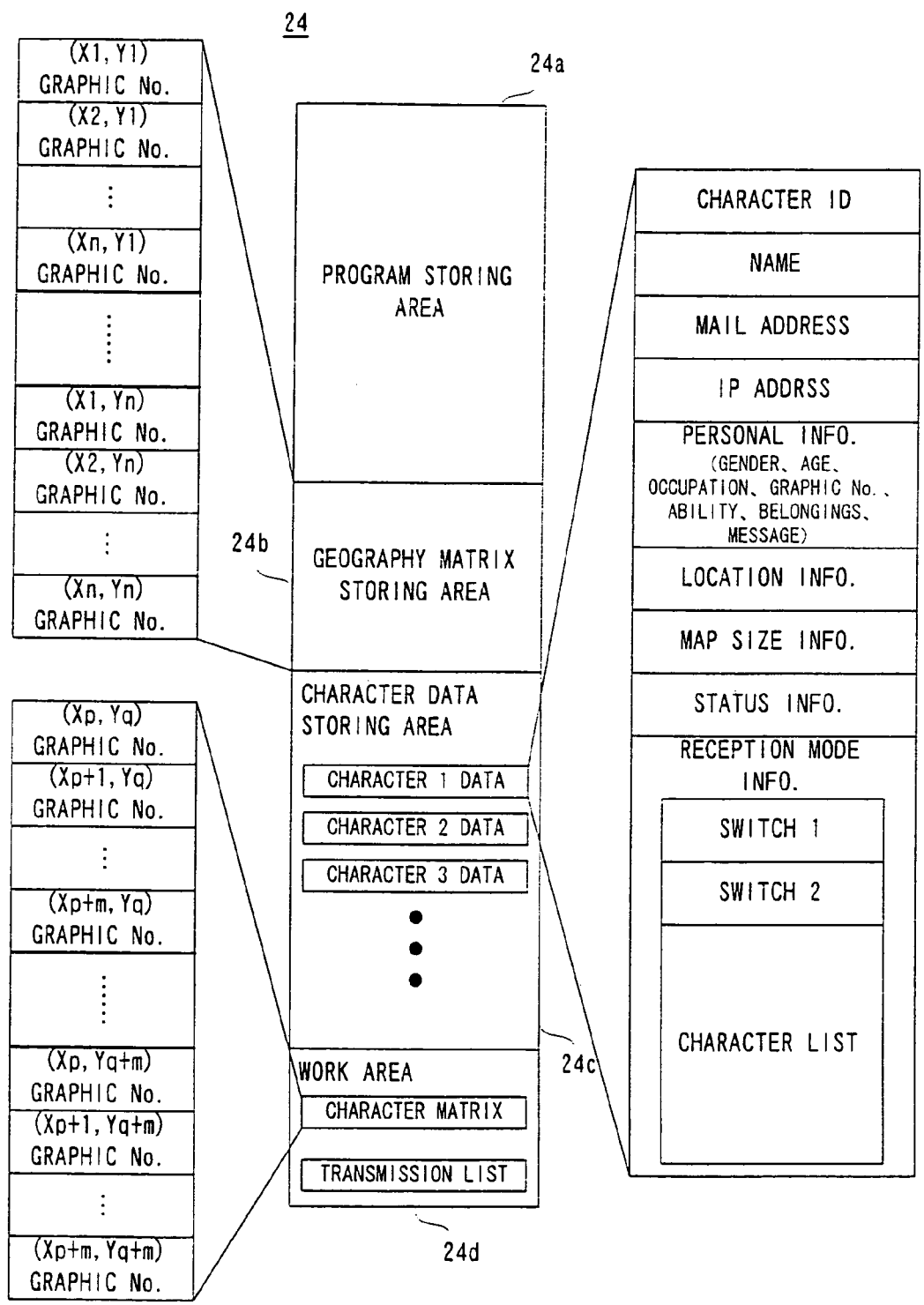
FIG. 3 is an illustrative view showing a mapping state of a memory provided in the game server.

The game server 20 is provided with a CPU 22 and a memory 24 as shown in FIG. 2, and a program storing area 24a, a geography matrix storing area 24b, a character data storing area 24c and a work area 24d are formed in the memory 24 as shown in FIG. 3. The program storing area

24*a* stores a game program, the geography matrix storing area 24*b* stores matrix data showing a virtual space geography in which the game is played. In addition, the character data storing area 24*c* stores data (character data) of characters 1, 2, 3 . . . operated by each player. Furthermore, the work area 24*d* stores matrix data (character matrix) showing characters appearing in the virtual space and a transmission list which cites a transmission destination of the character matrix.

With respect to the memory 24, in addition to a storing medium undetachably provided inside an apparatus such as a hard disk or a non-volatile memory (EEPROM, for example), a detachable storing medium such as a magnetooptical disk or a memory card may be used.

The game program stored in the program storing area 24*a* carries out processes in accordance with flowcharts shown in FIGS. 23 to 31.

The matrix data stored in the geography matrix storing area 24*b* is data showing a geography (map) of the entire virtual space. The virtual space is divided into n blocks in either horizontal or vertical direction, and coordinates (X1, Y1) to (Xn, Yn) are assigned to each block. The geography matrix is illustrated by coordinate data of each block and an identifying number (graphic number) of graphic data to be reproduced in each block.

The character data stored in the character data storing area 24*c* is formed of an character ID, a name, a mail address, an IP address, personal information, position information, map size information, status information and reception mode information. The character ID is a unique identifier assigned to each character, the name is a unique character name assigned to each character, and each of the mail address and the IP address is a unique address assigned to a player (portable communication terminal 30) operating the character. The mail address is used upon transmitting a log-in operation request from the game server 20 to the portable communication terminal 30, the IP address is used upon transmitting the map data or the like to the portable communication terminal 30 which completed the logging-in.

The personal information includes a character's gender, a character's age, a character's occupation, a character's graphic number, a character's own capability, character's belongings (item) and a message sent out by the character to each player. The position information is information showing in what block (coordinate) in the virtual space the character is present, and for what direction the character is headed. The map size information is information to show which size of the virtual space, size 1 or size 2, is to be displayed on the player's portable communication terminal 30, and the status information is information to show which state, log-in or log-out, the player is in.

The reception mode information is information to show from which player a call-out is allowed to receive. In accepting a call-out from any player (neutral reception), "ALLOW CALL" is set on a switch 1, "ALLOW ALL CHARACTERS" is set on a switch 2, and the character list columns become blank. In accepting the call-out from a particular character only (receive the call-out from a friend only), "ALLOW CALL" is set on the switch 1, and "ALLOW PARTICULAR CHARACTER ONLY" is set on the switch 2, and a name of the particular character (friend character) is registered on the character list.

In accepting the call-out from a character other than the particular character (refusing a call from a suspicious character), "ALLOW CALL" is set on the switch 1, "allow any character except the particular one" is set on the switch 2, and a name of the particular character (suspicious character) is registered on the character list. In refusing the call-out from any of these characters. "PROHIBIT CALL" is se: on the switch 1, and a content of the switch 2 and the character list become invalid. The game server 20 determines whether or not to transmit the log-in operation request with referring to the reception mode information when a certain player requests to transmit the log-in operation request to another player.

It is noted that players who wish to participate in the game are required to make an advance registration on the game server 20, and upon the registration, arbitrary character data is created by the player.

The character matrix stored in the work area 24*d* is matrix data showing the characters appearing in the virtual space. The character matrix is created with respect to one part of the virtual space which centers on the character of a request source player when a log-in request, a log-out request, a character moving request or the like are applied from the player. The one part of the virtual space is divided into m blocks in either horizontal or vertical direction, coordinates (Xp, Yp) to (Xp+m, Yp+m) are assigned to each block (m<n). Similar to the geography matrix, the character matrix is also illustrated by the coordinate data and the graphic data.

Notwithstanding the same character, a display manner differs if a character's direction is different (facing forward, facing backward, facing to the right, facing to the left). In addition, a character in the middle of logging-out is displayed in a sleeping state in the virtual space. In this manner, since there are a plurality of display manners with respect to characters, in order to identify the display manner, an extension identifier is added to each graphic number. For example, if a character is facing forward, "f" is added, if a character is facing backward, "b" is added, if a character is facing to the right, "r" is added, if a character is facing to the left, "l" is added, and if a character is in a sleeping state, "s" is added. It is noted that the coordinate and the direction of each character are specified by the position information, and log-in/log-out is specified by the status information.

The transmission list stored in the work area 24*d* is a list which cites players to whom the map data formed of the geography matrix and the character matrix are to be transmitted. The portable communication terminal 30 which requires to renew the virtual space is different according to a size (map size) of the virtual space to be displayed and a relative position between a character of a player who transmitted the log-in request, the log-out request, the moving request and etc. and another character. Due to this, players who require to renew the virtual space are cited on the transmission list based on the position information of each character and the map size information.

From the geography matrix area 24*b* and the work area 24*d*, one part of the geography matrix and one part of the character matrix which center on the character or each cited player are carved out, and the carved-out geography matrix and the character matrix are transmitted to the each player's portable communication terminal 30 as the map data.

Figure 4:
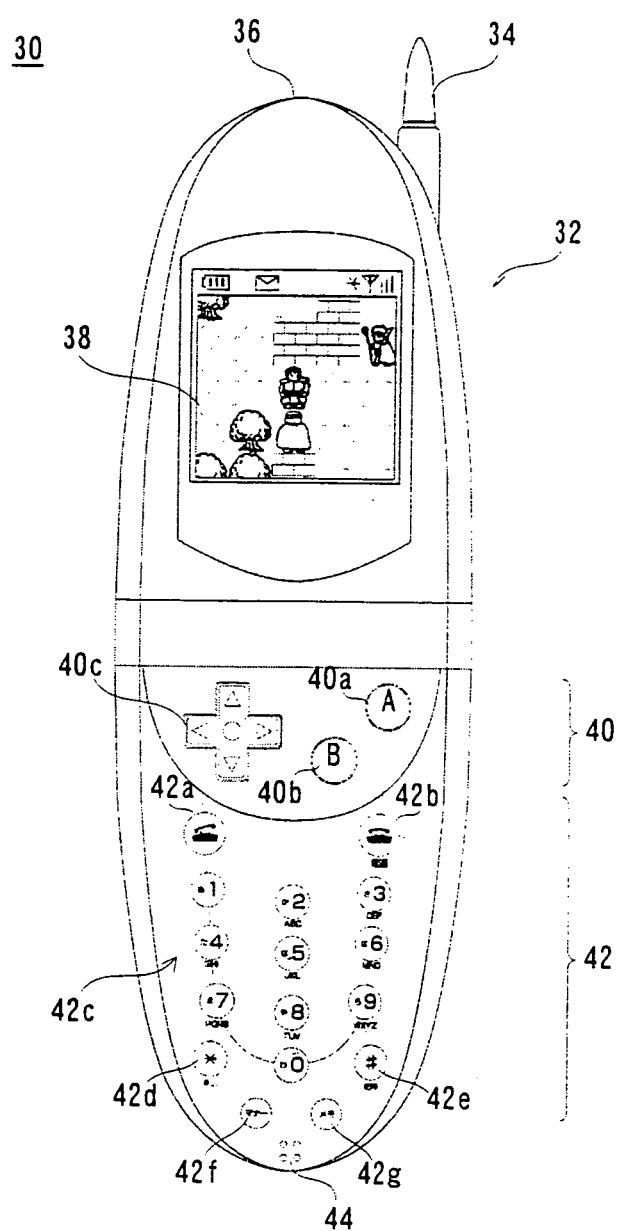
FIG. 4 is an outline view showing one example of a portable communication terminal.

The portable communication terminal 30 includes a main body 32 formed in a thin long elliptical manner as shown in FIG. 4. An antenna 34 is protruded on an upper surface of the main body 32, and a communication-use speaker 36, a display 38, a game key 40, telephone key 42 and a communication-use microphone 44 are arranged at a front surface. With respect to the game key 40, an A button 40*a* and a B button 40*b* to control his own character's behavior, a menu screen display, a menu item selection or the like and a cross key 40*c* in order to move his own character and a cursor on the menu screen are present. With respect to the telephone key 42, a hook key 42*a*, a hold key 42*b*, a number key 42*c* showing "0" to "9", a key 42*d*, a # key 4*e*, a manner key 42*f* and a voice memory key 42*g* are present. It is noted that alphabet, Japanese syllabary characters or hiragana in Japanese and etc. are assigned to the number key 42*c*, the *key 42*d* and the # key 42*e*. Therefore, it becomes possible to create mail.

Figure 5:
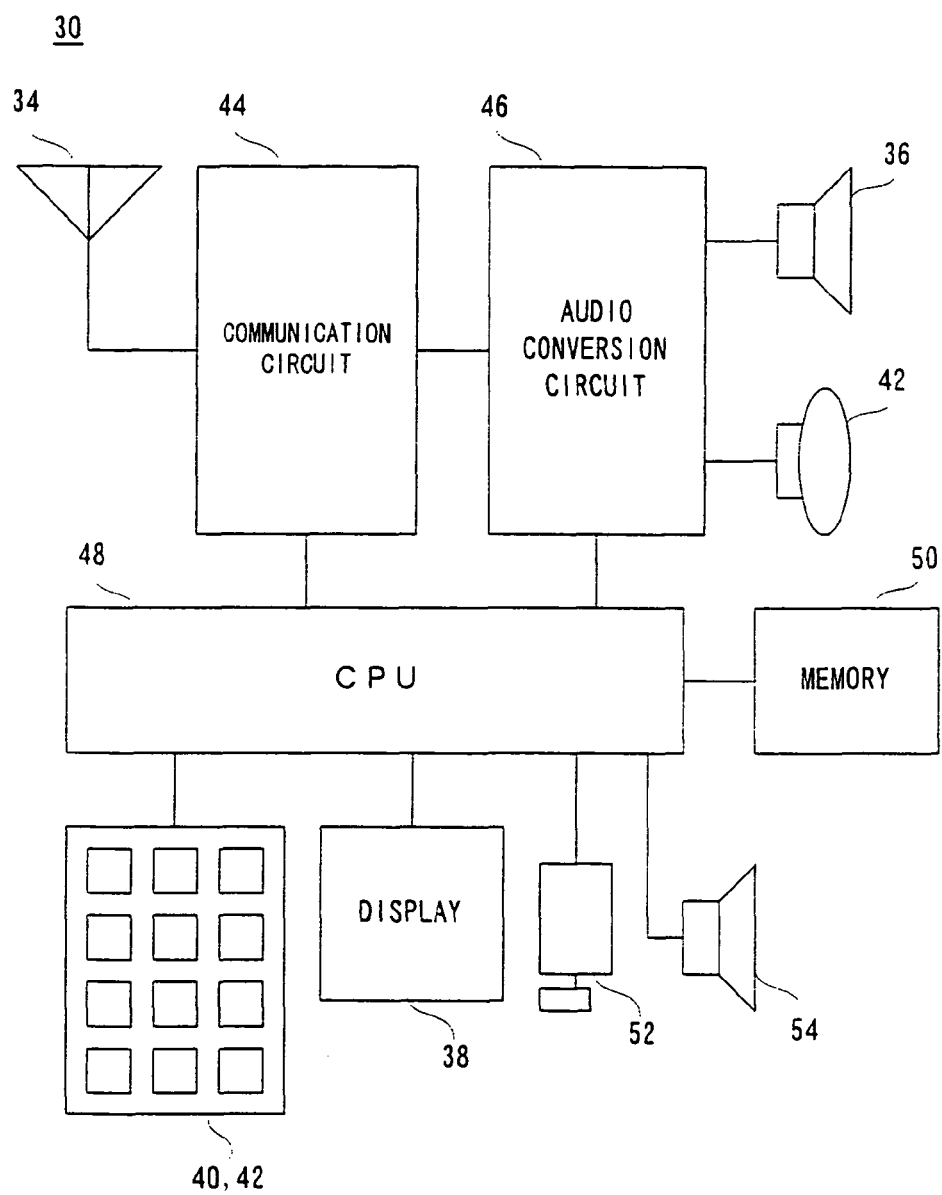
FIG. 5 is a block diagram showing one example of a configuration of the portable communication terminal.

An inner portion of the main body 32 is constituted as shown in FIG. 5. The antenna 34 is connected to a communication circuit 44, and the communication-use speaker 36 and the communication-use microphone 42 are connected to an audio conversion circuit 46. The communication circuit 44 and the audio conversion circuit 46 are connected to each other, and respectively controlled by the CPU 48. To the CPU 48, the game key 40, the telephone key 42, the display 36, a vibration motor 52, a call-use speaker 54 and a non-volatile memory 50 such as EEPROM are connected. The vibration motor 52 vibrates the main body 32 upon receiving the mail or a call signal, and the call-use speaker 54 outputs a beep sound upon receiving the mail or the call signal. It is noted that the call-use speaker 54 is provided at a rear side of the main body 32.

Figure 6:
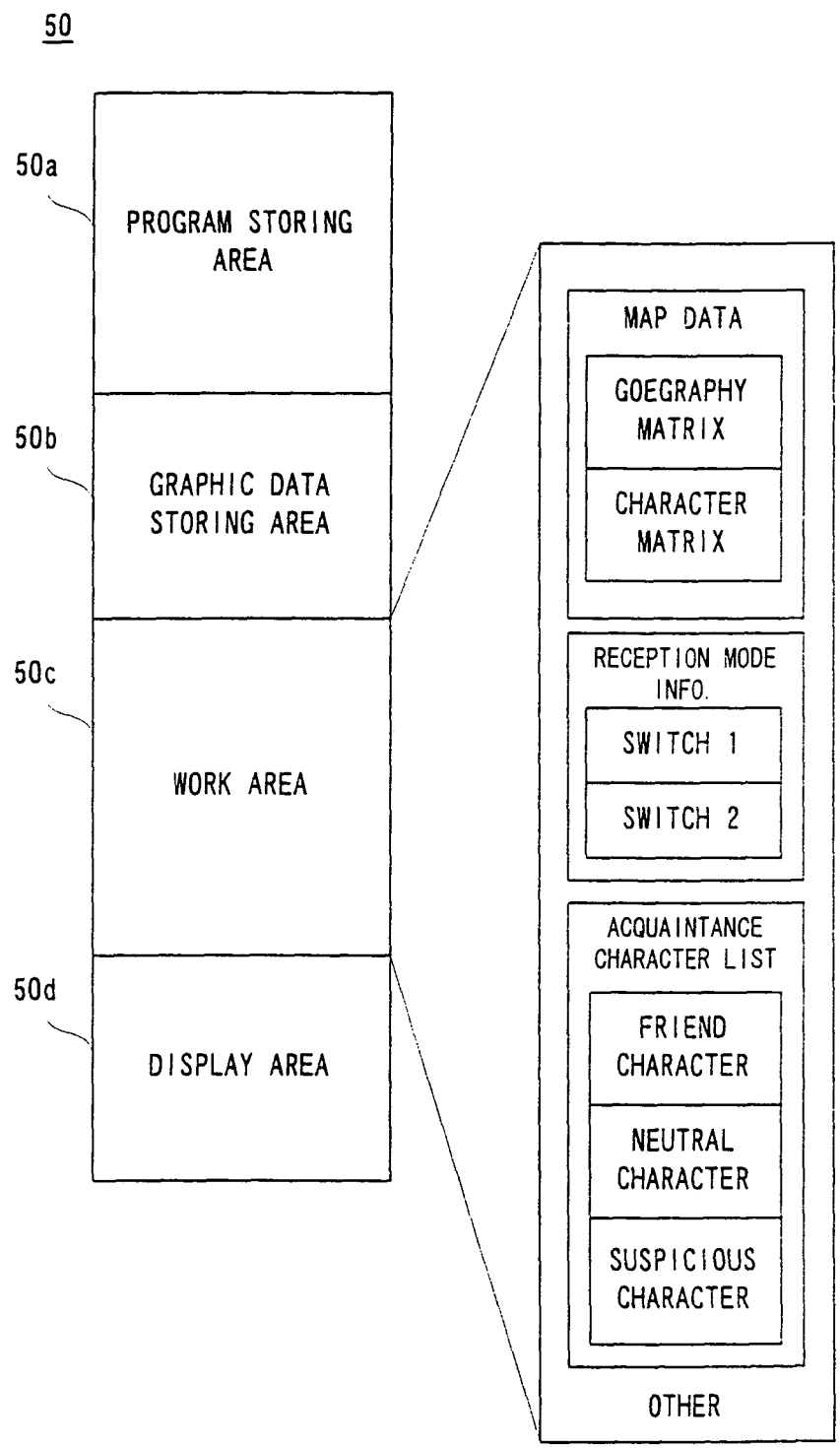
FIG. 6 is an illustrative view showing a mapping state of a memory provided in the portable communication terminal.

In the memory 50, a program storing area 50*a*, a graphic data storing area 50*b*, a work area 50*c* and a display area 50*d* are formed as shown in FIG. 6. The program storing area 50*a* stores a game program received from the game server 20 when the player registers the character data. The graphic data storing area 50*b* stores the graphic data received from the game server 20 at a time of logging-in. The work area 50*c* stores the map data received in the middle of logging-in from the game server 20, the reception mode information set by the player himself, and the friend character list. The reception mode information and the friend character list are transferred from the program storing area 50*a* to the work area 50*d* at a time of logging-in, and transferred from the work area 50*d* to the program storing area 50*a* at a time of logging-out.

Although it is necessary that the program storing area 50*a* is formed on a non-volatile memory, the graphic data storing area 50*b*, the work area 50*c* and the display area 50*d* may be formed on a volatile RAM. In addition, although the graphic data may be received together with the game program upon registering to the game server 20, in this case, it is necessary that the graphic data storing area 50*b* is formed on a non-volatile memory.

The game program stored in the program storing area 50*a* carries out processes according to flowcharts shown in FIGS. 32 to 46.

The game program stored in the graphic data storing area 50*b* includes image data of objects forming the virtual space such as "tree", "rock", "lawn" and image data of the characters appearing in the virtual space, and different graphic numbers are respectively assigned to each image data. With respect to the character, as described above, there are five states, that is, facing-forward, facing-backward, facing-to-the-right, facing-to-the-left, and in the middle of sleeping. Image data showing each state is prepared in the graphic data storing area 50*b*. Although a common graphic number is assigned to each image data, an extension identifier added to the graphic number is respectively different.

Figure 7:
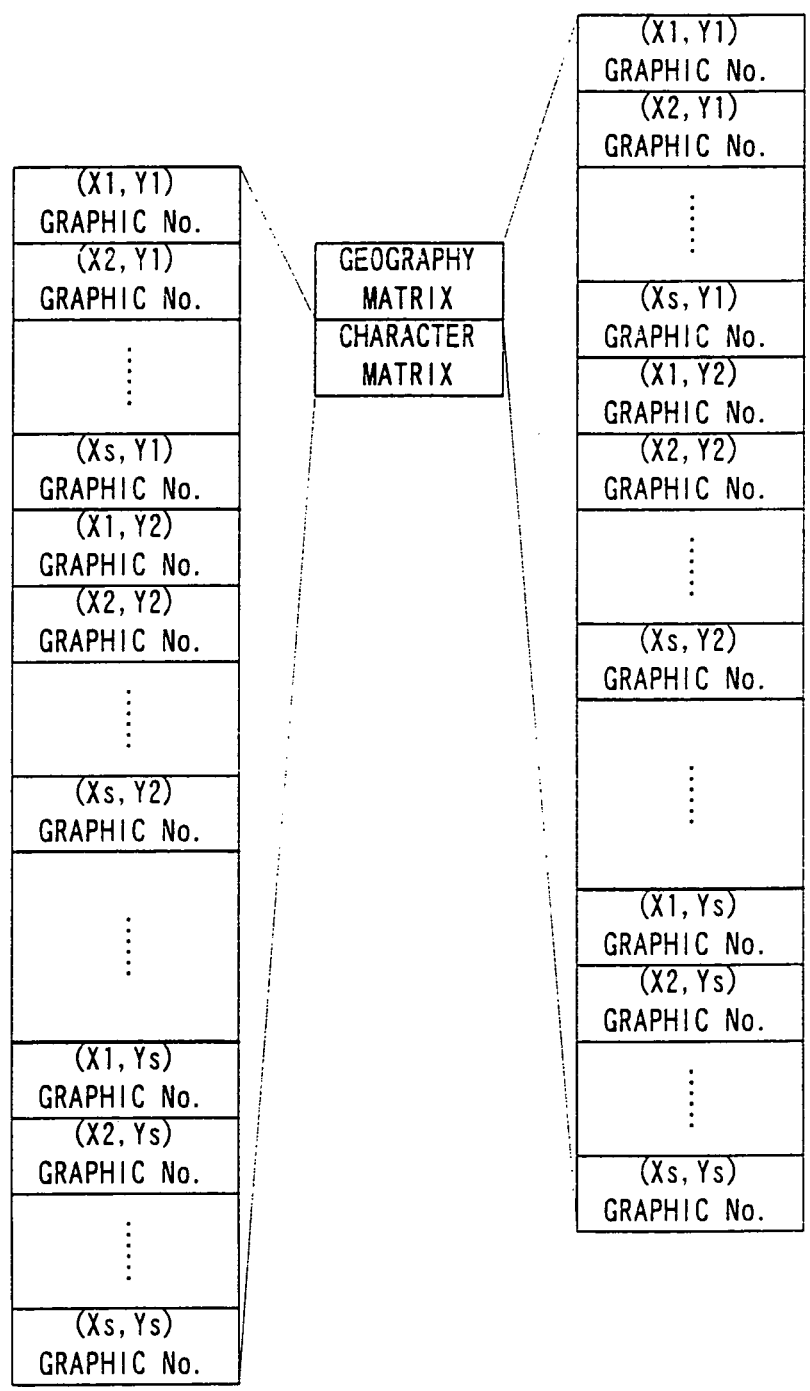
FIG. 7 is an illustrative view showing a structure of map data.

The map data stored in the work area 50*c* is formed of the geometry matrix of the virtual space (size 1 or size 2 virtual space) to be reproduced on the display 38 and the character matrix. As shown in FIG. 7, the geography matrix is formed of coordinates (X1, Y1) to (Xs, Ys) of blocks forming the virtual space and the graphic numbers of the geography to be reproduced in each block, and the character matrix is also formed of coordinates (X1, Y1) to (Xs, Ys) of blocks forming the virtual space and the graphic number of the characters to be reproduced in each block. In a case of the size 1 virtual space, the number of horizontal blocks and the number of vertical blocks are, for example, "9" (s=9), and in a case of the size 2 virtual space, the number of horizontal blocks and the number of vertical blocks are, for example, "5" (s=5). It is noted that with respect to either size 1 or size 2, s<m is applied.

Figure 8:
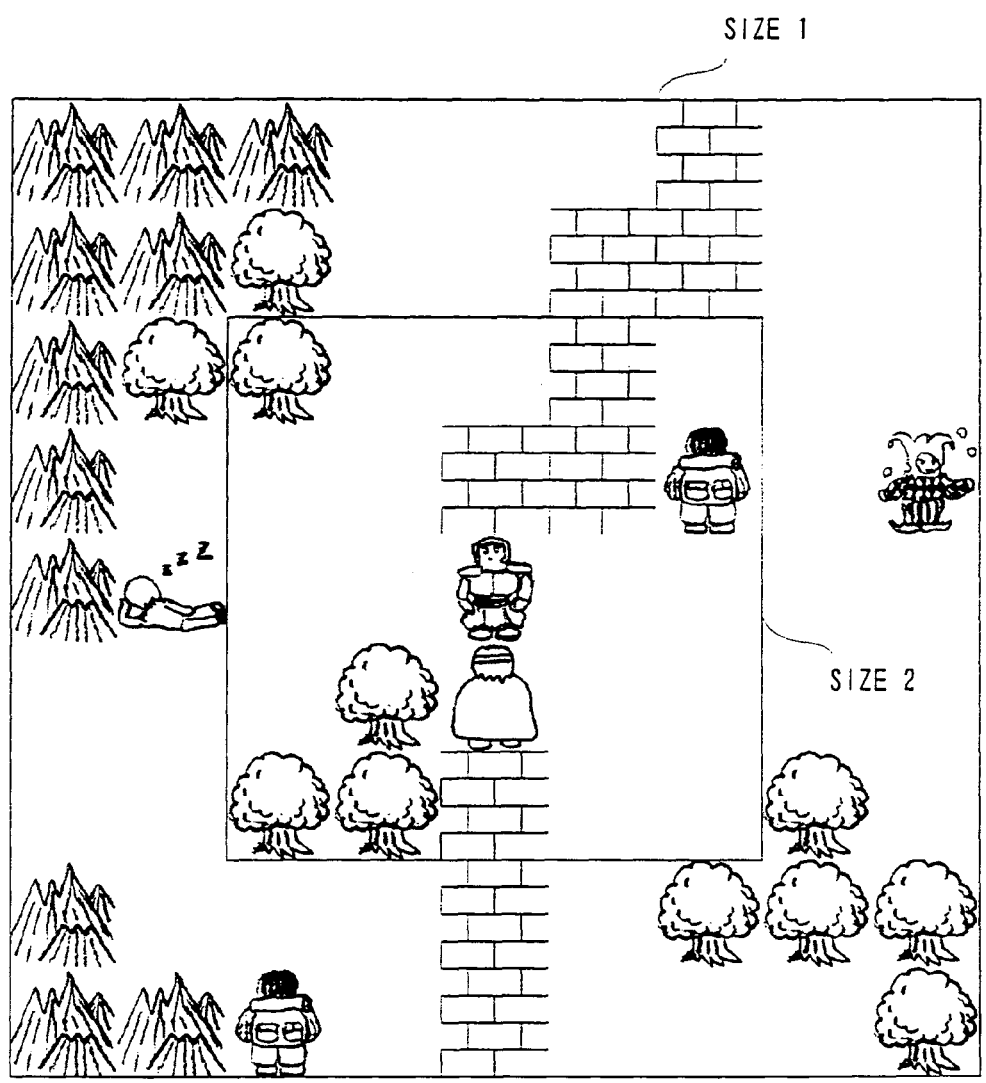
FIG. 8 is an illustrative view showing one example of a virtual space.

Based on such the map data and the graphic data of the graphic data storing area 50*b*, virtual space data (game screen data) of size 1 or size 2 shown in FIG. 8 is created. The created virtual space data is stored in the display area 50*d*, and the virtual space (game screen) based thereon is displayed on the display 38. According to FIG. 8, the geography is expressed by "rock", "tree", "stone pavement" and etc., and characters such as "clown", "wizard", "mountain man" and etc. appear on such the geography. Characters in the middle of logging-in stand up and walk around in the virtual space. On the other hand, characters in the middle of logging-out are sleeping in a place where he was present immediately before the log-out. That is, in this embodiment, all the characters registered in the game server 20 are reproduced in the virtual space no matter whether or not the player logs-into the game server 20.

Returning to FIG. 6, the reception mode information stored in the work area 50*c* is different from the reception mode information forming the character data on a game server 20 side in that the former has the switch 1 and 2 only. However, the acquaintance character list is stored other than the reception mode information, and a sub list of "FRIEND CHARACTER", "NEUTRAL CHARACTER" and "SUSPICIOUS CHARACTER" are formed onto the acquaintance character list. Meanings which switch 1, switch 2, friend character, neutral character, and suspicious character carry is same on either the game server 20 side or the portable communication terminal 30 side.

Figure 9:
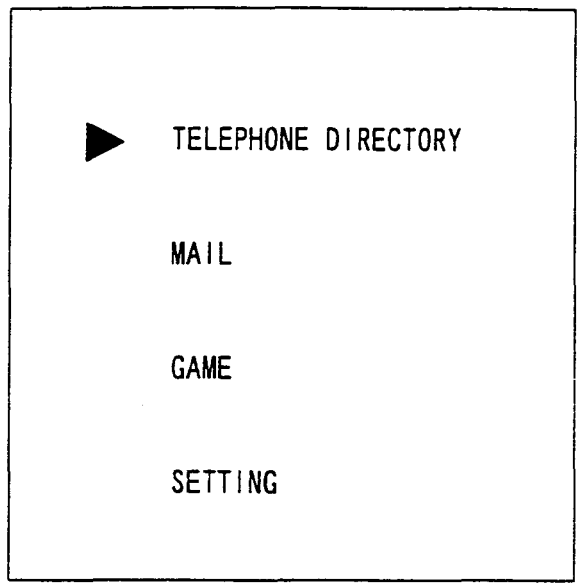
FIG. 9 is an illustrative view showing one example of a start menu screen displayed on the portable communication terminal.
Figure 10:
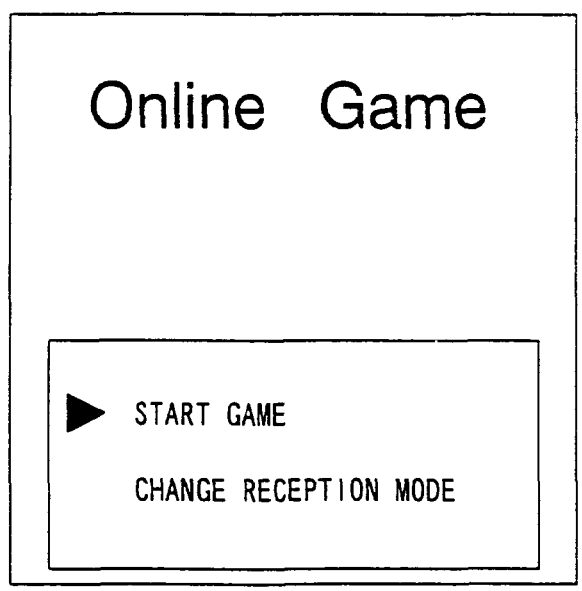
FIG. 10 is an illustrative view showing one example of a game start screen displayed on the portable communication terminal.

On the display 38 of the portable communication terminal 30 in the middle of logging-out, a start menu screen shown in FIG. 9 is displayed, and if "GAME" is herein selected, the start menu screen is renewed to a game menu screen shown in FIG. 10. According to the FIG. 10, a title "Online Game" is displayed at an upper side of the screen, and a menu item of "START GAME" and "CHANGE RECEPTION MODE", and a cursor pointing at either menu item is displayed at a lower side of the screen. If a player selects "START GAME" by the cross key 40*c* and the A button 40*a*, a log-in request is transmitted from the portable communication terminal 30 to the game server 20. The game server 20 detects character data of the player who transmitted the log-in request from the character data storing area 24*c* shown in FIG. 3, and renews the status information included in the detected character data from "log out" to "log in".

Furthermore, based on the position information, the map size information and the status information included in each character data, players who need to renew the screen as a result of the present log-in are brought onto the transmission list 24*d*, and the map data is respectively created with respect to the players brought onto the list. The created map data is transmitted to the portable communication terminal 30 of each player brought onto the list. The portable communication terminal 30 which received the map data displays a game screen on the display 38 based on this map data. The display of the portable communication terminal 30 which logged in this time is renewed from the game menu screen shown in FIG. 10 to a game screen shown in FIG. 11 or 12. In the portable communication terminal 30 which already logged in, a character in the middle of sleeping displayed on the game screen stands up.

If a player who logged in operates the cross key 40, a moving request is transmitted to the game server 20. The game server 20, upon being given the moving request, detects the character data of a request source player from the character data storing area 24*b*, and renews the position information included in the detected character data. Furthermore, as described above, players who need to renew the game screen are brought onto a list, map data differing depending on each player brought onto the list is created, and the created map data is transmitted to the portable communication terminal 30 of each player. Due to this, the display 38 of the portable communication terminal 30 which received the map data is renewed based on this map data. That is, the character of the player who operated the cross key 40*c* moves on the game screen of each portable communication terminal 30 which received the map data.

Figure 13:
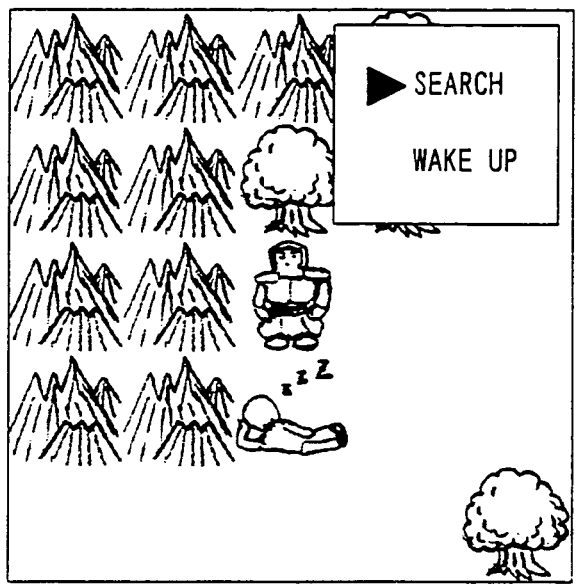
FIG. 13 is an illustrative view showing one example of the virtual space and action menu screen displayed on the portable communication terminal.

If the player moves his own character in front of another character, and operates the A button 40*a*, an action menu screen having two menu items of "SEARCH" and "WAKE-UP" as shown in FIG. 13 is displayed at an upper right of the screen in an OSD manner. Herein, if the player selects "SEARCH" by operating the cross key 40*c* and the A button 40*a*, "SEARCH" information is transmitted to the game server 20. The game server 20 detects character data of a player who transmitted the "SEARCH" information from the character data storing area 24*c* shown in FIG. 3, and specifies the character data of an opponent to be searched (a character present in front) based on the position information (coordinate and direction) included in the detected character data and the position information (coordinate) included in another character data. Furthermore, the game server 20 sends back personal information included in the specified character data to the "SEARCH" information transmission source. The portable communication terminal 30 which received the character name and the personal information registers the character name onto a sub list of "NEUTRAL CHARACTER" shown in FIG. 6 first, and then displays the personal information as shown in FIG. 14 on the display 38.

Figure 14:
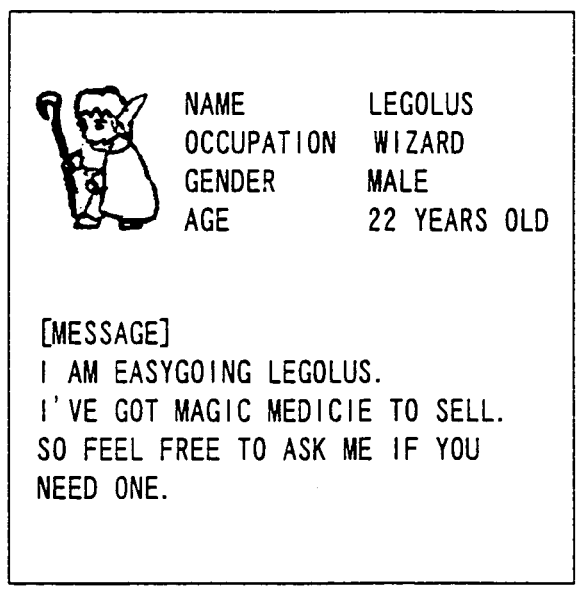
FIG. 14 is an illustrative view showing one example of a personal information screen displayed on the portable communication terminal.

According to FIG. 14, a character image is displayed at an upper left of the screen, a character's name, occupation, gender and age are displayed on a right side of the character image, and a message is displayed at a lower side of the screen. The character image is created based on the graphic number included in the personal information and the graphic data stored in the graphic data storing area 50*b* shown in FIG. 6. In addition, among the personal information received, capability and belongings are not displayed.

If "WAKE-UP" is selected on the action menu screen shown in FIG. 13, the "WAKE-UP" information is transmitted from the portable communication terminal 30 to the game server 20. The game server 20 detects from the character data storing area 24*c* shown in FIG. 3 the character data of the player who transmitted the "WAKE-UP" information, and specifies the character data of an opponent to be awaken (character present in front) based on the position information included in the detected character data and the position information included in another character data. Furthermore, the game server 20 determines reception mode information included in the specified character data.

Figure 15:
FIG. 15 is an illustrative view showing one example of a virtual space, an action menu screen, and a reply message displayed on the portable communication terminal.

Herein, if a content of the switch 1 is "PROHIBIT CALL", information A is sent back to the "WAKE-UP" information transmission source. On the display 38 of the portable communication terminal 30 in receipt of the information A, a message that says "SLEEP WELL, NO SIGN OF WAKING UP" is displayed as shown in FIG. 15.

Notwithstanding the content of the switch 1 "ALLOW CALL", in a case that the content of the switch 2 is "allow only particular character", and the character name of the "WAKE-UP" information transmission source is not registered on the character list, or in a case that the content of the switch 2 is "ALLOW EXCEPT FOR PARTICULAR CHARACTER", and the character name of the "WAKE-UP" information of the transmission source is registered on the character list, the information A is sent back as described above, and a message shown in FIG. 15, is displayed on the transmission source of the portable communication terminal 30.

By contrast thereto, in a case that the content of the switch 1 and switch 2 is "ALLOW CALL" and "ALLOW ALL CHARACTERS", in a case that the content of the switch 1 and switch 2 is "ALLOW CALL" and "ALLOW PARTICULAR CHARACTER ONLY", and the request source character name is registered on the character list, or in a case that the content of the switch 1 and the switch 2 is "ALLOW CALL" and "ALLOW EXCEPT FOR PARTICULAR CHARACTER", and the request source character name is not registered on the character list, dedicated game-use mail (log-in operation request) is transmitted from the game server 20 to the portable communication terminal 30 of the opponent to be raised. That is, a mail address of the opponent to be awaken is detected from the character data storing area 24*c*, and the dedicated game-use mail including the request source character name is transmitted to the deleted address.

Figure 17:
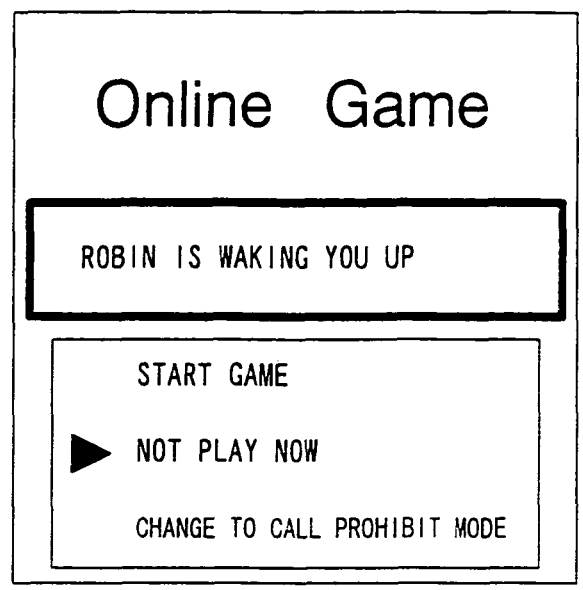
FIG. 17 is an illustrative view showing one example of a calling screen displayed on the portable communication terminal.

On the display 38 of the portable communication terminal 30 in receipt of the dedicated game-use mail, a calling screen shown in FIG. 17 is displayed. According to FIG. 17, a calling message including the request source character name is displayed at a center of the screen, and three menu items of "START GAME", "NOT PLAY NOW", and "CHANGE TO CALLING PROHIBITING MODE" are displayed below the calling message.

Herein, if the player in receipt of the dedicated game-use mail selects "START GAME" by the cross key 40*c* and the A button 40*a*, the corresponding command information is sent back to the game server 20. The game server 20 carries out the same process as in receipt of the log-in request, and due to this, a display of a plurality of portable communication terminals 30 including the portable communication terminal 30 which transmitted the "WAKE-UP" information and the portable communication terminal 30 in receipt of the dedicated game-use mail is renewed.

Figure 16:
FIG. 16 is an illustrative view showing another example of the virtual space, the action menu screen, and the reply message displayed on the portable communication terminal.

If the player in receipt of the dedicated game-use mail selects "NOT PLAY NOW" shown in FIG. 17, the corresponding command information is sent back to the game server 20. The game server 20 hereupon sends back the information B to the "WAKE-UP" information transmission source. On the display 38 of the portable communication terminal 30 in receipt of the information B, a message that says "ZZZ . . . WAKE UP SOON? MAYBE NOT" is displayed as illustrated in FIG. 16.

If the player in receipt of the dedicated game-use mail selects "CHANGE TO PROHIBIT CALL MODE" shown in FIG. 17, the content of the switch 1 of the reception mode information shown in FIG. 6 is renewed to "PROHIBIT CALL", and the command information corresponding to the selected menu item is sent back to the game server 20. The game server 20 hereupon detects the character data of the player who transmitted the command information from the character data storing area 24*c* shown in FIG. 3, and changes the content of the switch 1 of the reception mode information included in the detected character data to "PROHIBIT CALL". In addition, the information A is transmitted to the "WAKE-UP" information transmission source. In the "WAKE-UP" information transmission source, a message shown in FIG. 15 is displayed.

Figure 12:
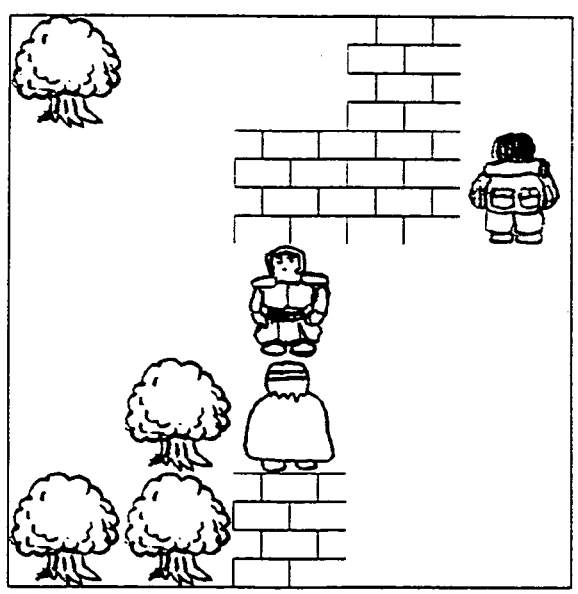
FIG. 12 is an illustrative view showing another example of the virtual space displayed on the portable communication terminal.
Figure 18:
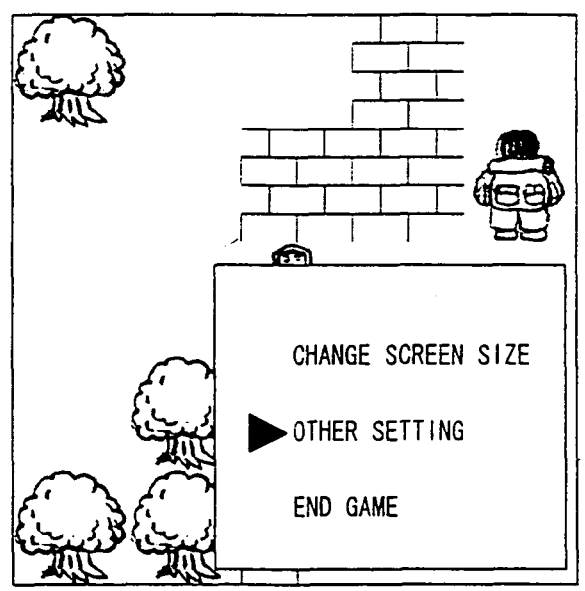
FIG. 18 is an illustrative view showing a virtual space and a system menu screen displayed on the portable communication terminal.

If the player operates the B button 40*b* while neither of menu screens is displayed as shown in FIG. 12, the system menu screen shown in FIG. 18 is displayed on the display 38 in the OSD manner. According to FIG. 18, three menu items of "CHANGE SCREEN SIZE", "OTHER SETTING", and "END GAME" are displayed on the display 38.

Figure 11:
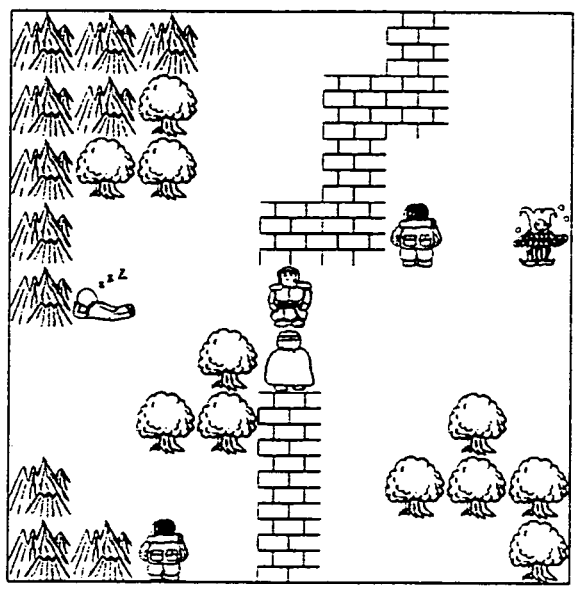
FIG. 11 is an illustrative view showing one example of a virtual space displayed on the portable communication terminal.

If the player herein selects "CHANGE SCREEN SIZE" by the cross key 40*c* and the A button 40*a*, a size change request is transmitted- to the game server 20. The game server 20 hereupon detects the request source character data from the character data storing area 24*c* shown in FIG. 3, and renews the map size information included in the detected character data. That is, if the map size information prior to receiving the size change request is "SIZE 1", the renewal is made to "SIZE 2", and if the map size information prior to receiving the size change request is "SIZE 2", the renewal is made to "SIZE 1". Furthermore, the map data is created based on the renewed map size information, and the created map data is sent back to the request source portable communication terminal 30. The portable communication terminal 30 creates game screen data based on the received map data, and due to this, the game screen is displayed on the display 38 as shown in FIG. 11.

If the cursor is set to "END GAME" and the A button 40*a* is pressed when the system menu screen shown in FIG. 18 is displayed, a log-out request is transmitted to the game server 20. The game server 20 detects the character data of the request source player from the character storing area 24*b*, and renews the status information included in the detected character data. Furthermore, as described above, players who need to renew the game screen are brought onto a list, map data is created differing depending on the players brought onto the list, and the created map data is transmitted to the portable communication terminal 30 of each player. A display of the portable communication terminal 30 in receipt of the map data is renewed based on the map data, and a player's character who logged-out are changed into a sleeping state on the screen. In the mean time, the display of the portable communication terminal 30 which transmitted the log-out request is renewed from the game screen shown in FIG. 18 to a start menu screen shown in FIG. 9.

Figure 19:
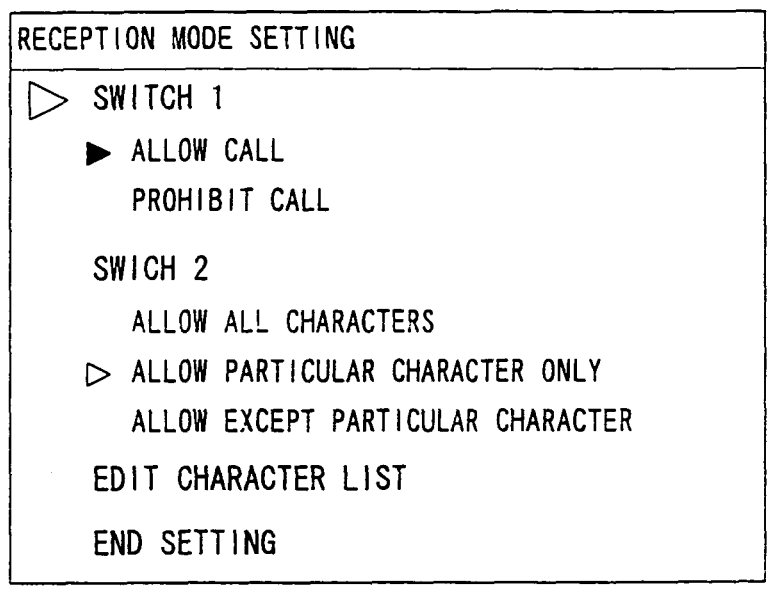
FIG. 19 is an illustrative view showing one example of a reception mode setting screen and a system menu screen displayed on the portable communication terminal.

If the player selects "CHANGE RECEPTION MODE" on the game menu screen shown in FIG. 10, a reception mode setting screen shown in FIG. 19 is displayed on the display 38. According to FIG. 19, "SWITCH 1", "SWITCH 2", "EDIT CHARACTER LIST" and "END SETTING" are displayed as a main item, sub items of "ALLOW CALL" and "PROHIBIT CALL" are displayed below the "SWITCH 1", and sub items of "ALLOW ALL CHARACTERS", "ALLOW PARTICULAR CHARACTER ONLY" and "ALLOW EXCEPT FOR PARTICULAR CHARACTER" are displayed below the "SWITCH 2".

First, the cursor pointing at "SWITCH 1", "SWITCH 2", "EDIT CHARACTER LIST" or "END EDITS" becomes validated, and the validated cursor moves when the cross key 40*c* is operated. If the A button 40*a* is pressed when the cursor points at a desired main item, a sub item cursor located below the desired main item becomes validated. If the validated cursor is set to the desired sub item, a content of the desired sub item is set to the reception mode information shown in FIG. 6. For example, if the validated cursor is set to "ALLOW CALL", "ALLOW CALL" is set to the switch 1 of the reception mode information shown in FIG. 6. In addition, if the validated cursor is set to "ALLOW PARTICULAR CHARACTER ONLY", "ALLOW PARTICULAR CHARACTER ONLY" is set to the switch 2 of the reception mode information shown in FIG. 6.

Figure 20:
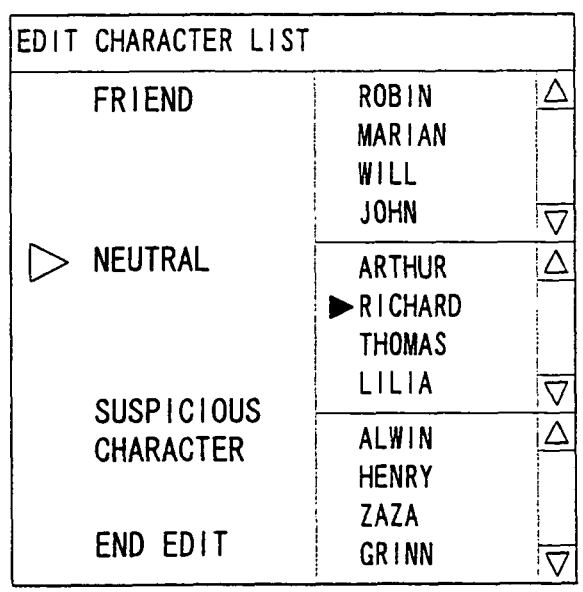
FIG. 20 is an illustrative view showing one example of a character list editing screen displayed on the portable communication terminal.

If the A button 40*a* is pressed when the validated cursor points at "EDIT CHARACTER LIST", a character list editing screen shown in FIG. 20 is displayed on the display 38 in place of the reception mode setting screen. According to FIG. 20, "FRIEND", "NEUTRAL", "SUSPICIOUS CHARACTER", and "END EDITING" are displayed as a main list. Sub lists of the friend character, a sub list of the neutral character and a sub list of the suspicious character are respectively displayed below "FRIEND", "NEUTRAL", and "SUSPICIOUS CHARACTER". Each sub list is coincident with the sub list shown in FIG. 6.

Figure 21:
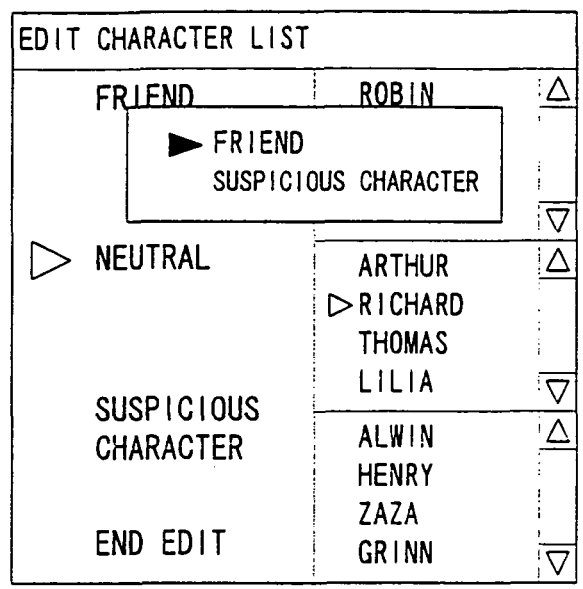
FIG. 21 is an illustrative view showing one example of a character list editing screen and a moving destination list displayed on the portable communication terminal.

Also, firstly a cursor above the main list is herein validated. If the A button 40*a* is pressed while the validated cursor points at the desired menu item, the cursor on the sub list below the desired menu item is validated. If the A button 40*a* is pressed while the validated cursor on the sub list points at the desired character, a moving destination list is displayed as shown in FIG. 21. The menu items on the moving destination list are two sub lists at which the validated cursor is not presently pointed. For example, if the validated cursor points at the neutral character name, "FRIEND" and "SUSPICIOUS CHARACTER" are displayed on the moving destination list.

When the cursor on the moving destination list is set co the desired item, and the A button 40*a* is pressed, a character name at which the cursor points on the sub list is deleted from the sub list, and the deleted character name is added onto the sub list of the item at which the cursor points on the moving destination list. An this time, the friend character list shown in FIG. 6 is renewed at the same time. For example, if "FRIEND" is selected on the moving destination list when "RICHARD" is selected on the sub list of the neutral character name, "RICHARD" is deleted from the sub list of the neutral character, and "RICHARD" is added onto the sub list of the mend character.

If the cursor is set to "END EDIT" and the A button 40*a* is pressed after the character list has been edited in this manner, the character list editing screen is renewed to the reception mode setting screen shown in FIG. 19. If the cursor is set to "END EDIT" and the A button 40*a* is pressed, in the reception mode setting screen, reception mode information (transmission data) formed of the switch 1, the switch 2, and the character list is created, and the transmission data is transmitted to the game server 20. At this time, the switch 1 and the switch 2 of the transmission data are coincident with the switch 1 and the switch 2 of the reception mode information shown in FIG. 6, and a character list setting follows the content of the switch 2. If the switch 2 is "ALLOW ALL CHARACTERS", columns of the character list become blank, if the switch 2 is "ALLOW PARTICULAR CHARACTER ONLY", a friend character name is set onto the character list, and if the switch 2 is "ALLOW EXCEPT FOR PARTICULAR CHARACTER", a suspicious character name is set onto the character list.

The created reception mode information is transmitted to the game server 20. The game server 20 detects the character data of the player who transmitted the reception mode information from the character data storing area 24*c* shown in FIG. 3, and renews the reception mode information included in the detected character data by the received reception mode information. On the portable communication terminal 30 side, the display of the display 38 is renewed from the reception mode setting screen shown in FIG. 19 to the game menu screen shown in FIG. 10 after the reception mode information has been transmitted.

With referring to FIGS. 23 to 31, descriptions will be herein made with regard to processes of a CPU 22 provided in the game server 20.

Figure 23:
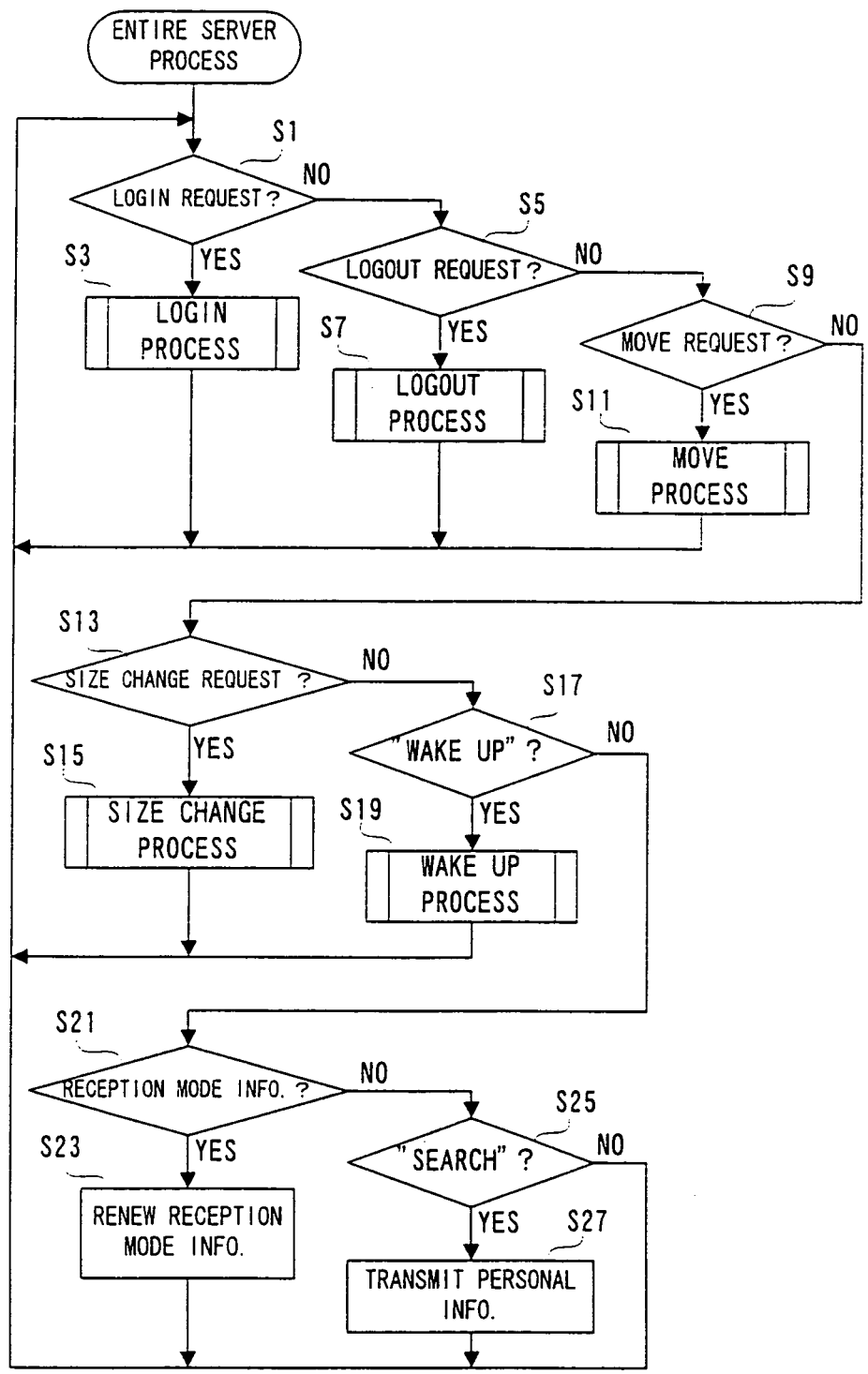
FIG. 23 is a flowchart showing another part of a processing of the game server.

Firstly, referring to FIG. 23, the CPU 22 determines what kind of requests or information are applied from the portable communication terminal 30 in respective steps of S1, S5, S9, S13, S17, S21 and S25. When a log-in request is applied, YES is determined in the step S1, and a log-in process is carried out in a step S3. When a log-out request is applied, YES is determined in the step S5, and a log-out process is carried out in a step S7. When a move request is applied, YES is determined in the step S9, and a move process is carried out in a step S11. When a size change request is applied, YES is determined in the step S13, and a size change process is carried out in a step S15. When "WAKE-UP" information is applied, YES is determined in the step S17, and a wake-up process is carried out in a step S19. After the processes of the S3, S7, S11, S15 or S19 have been finished, the process returns to the step S1.

When the reception mode information is applied, the process proceeds from the step S21 to a step S23. In this step, character data of the transmission source player is detected from the character data storing area 24c based on a character ID added to the reception mode information, and the reception mode information included in the detected character data is renewed according to the reception mode information transmitted from the portable communication terminal 30. As described above, the switch 1, the switch 2 and the character list are included in the transmitted reception mode information, and the switch 1, the switch 2 and the character list of the reception mode information detected from the character data storing area 24c are renewed by the switch 1, the switch 2 and the character list of the transmitted reception mode information.

When the "SEARCH" information is applied, the process proceeds from the step S25 to a step S27. In this step, character data of the transmission source player is detected from the character data storing area 24c based on a character ID included in the "SEARCH" information, and the character data of an opponent LO be transmitted (character present in a forefront of the transmission source character) is specified based on position information included in the detected character data and position information included in another character data. Furthermore, a character name and personal information are detected from the specified character data and the detected character name and the personal information are sent back to the "SEARCH" information transmission source.

Figure 24:
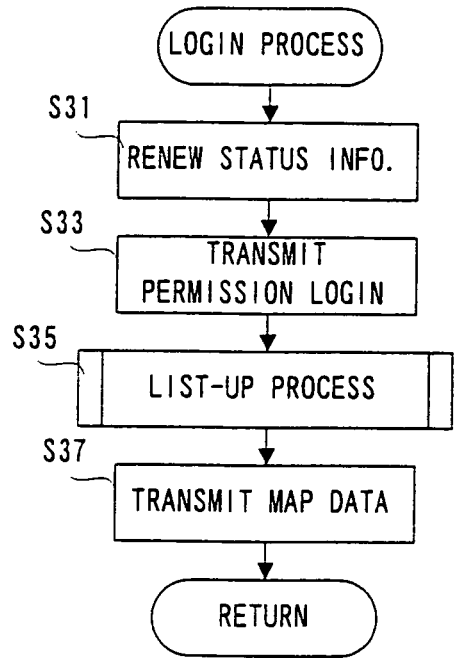
FIG. 24 is a flowchart showing still another part of a processing of the game server.

A log-in process in the step S3 follows a subroutine shown in FIG. 24. Firstly, in a step S31, character data of request source player is detected from the character data storing area 24b shown in FIG. 3 based on a character ID included in the log-in request, and status information included in the detected character data is renewed from "log-out" to "log-in". Upon completion of renewing the status information, a log-in permission is transmitted to the request source portable communication terminal 30 in a step S33, and players who need to renew map data are brought onto a list in a step S35. In a subsequent step S37, the map data is transmitted to the portable communication terminal 30 of the players brought onto the list. More specifically, the map data (geography matrix and character matrix) is created based on the position information and the map size information included in the character data of the players brought onto the list, and the created map data is transmitted to the portable communication terminal 30. Such the processes are carried out to each character ID brought onto the list, and the process returns to a routine on a higher hierarchy upon completion of the processes.

Figure 25:
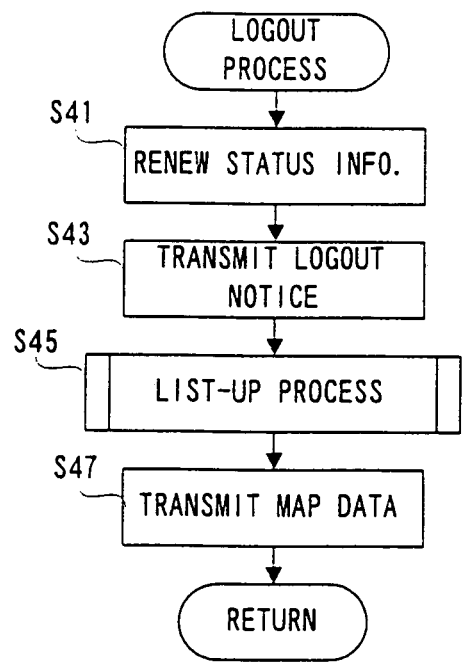
FIG. 25 is a flowchart showing yet another part of a processing of the game server.

The log-out process in the step S7 shown in FIG. 23 follows a subroutine in FIG. 25. Firstly, in a step S41, character data of the request source player is detected from the character data storing area 24b based on the character ID included in the log-out request, and the status information included in the detected character data is renewed from "log-in" to "log-out". Subsequently, a log-out notice (termination notice) is transmitted to the request source portable communication terminal 30 in a step S43, and players who need to renew the map data are brought onto a list in a step S45. In a step S47, the map data is transmitted to the portable communication terminal 30 of the players brought onto the list, and upon completion of the transmission, the process returns to a routine on a higher hierarchy.

Figure 26:
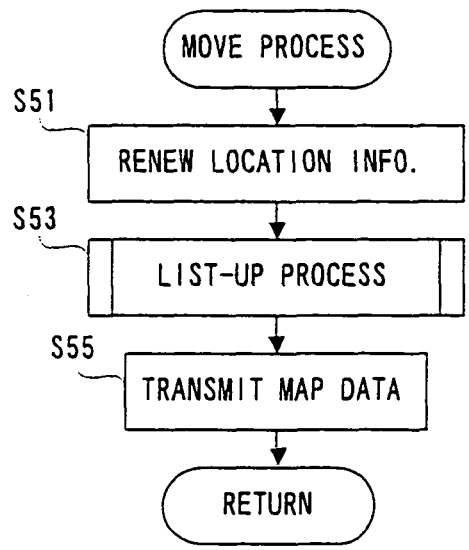
FIG. 26 is a flowchart showing another part of a processing of the game server.

A move process in the step S11 shown in FIG. 23 follows a subroutine shown in FIG. 26. Firstly, in a step S51, character data of the request source player is detected from the character data storing area 24d based on the character ID included in the move request, and position information (coordinate or direction) included in the detected character data is renewed according to the move request. Players who need to renew the map data are brought onto a list in a step S53, and the map data is transmitted to the portable communication terminal 30 of the players brought onto the list in a step S55. Upon completion of the transmission, the process returns to a routine on a higher hierarchy.

Figure 27:
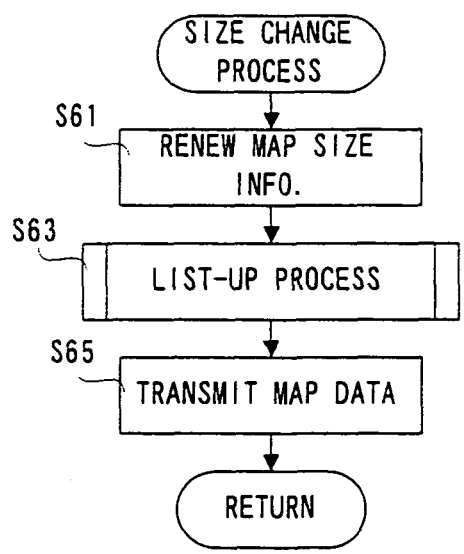
FIG. 27 is a flowchart showing still another part of a processing of the game server.

A size change process in the step S15 shown in FIG. 23 follows a subroutine shown in FIG. 27. Firstly, in a step S61, character data of the request source player is detected from the character data storing area 24c based on the character ID included in the size change request, the map information included in the detected character data is specified, and the specified map information is renewed. If the map information at this time is "SIZE 1", the renewal is made to "SIZE 2", if the map information at this time is "SIZE 2", the renewal is made to "SIZE 1". A same list-up process as described above is carried out in a step S63, and the map data is transmitted to the size change request transmission source only in a step S65. Upon completion of the transmission, the process returns to a routine on a higher hierarchy.

Figure 22:
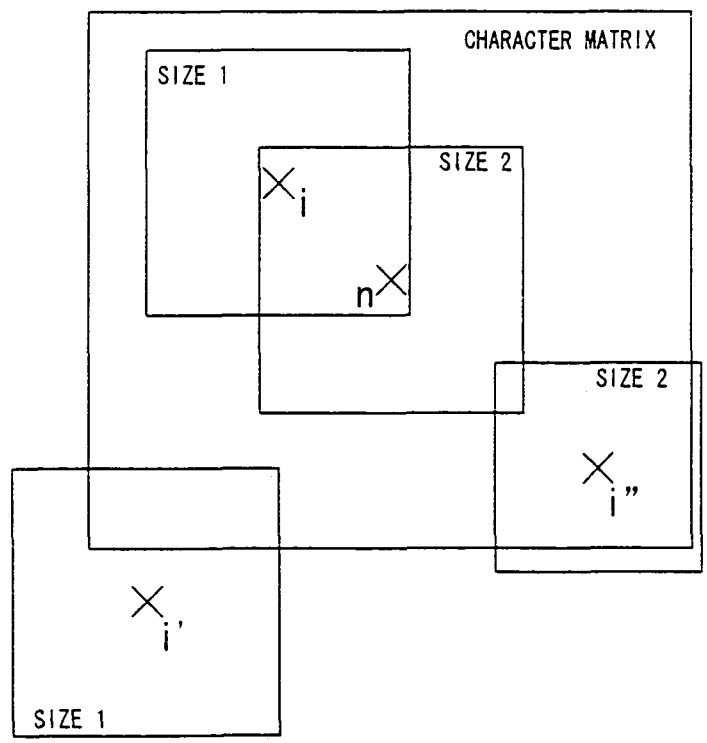
FIG. 22 is a flowchart showing one part of a processing of the game server.
Figure 28:
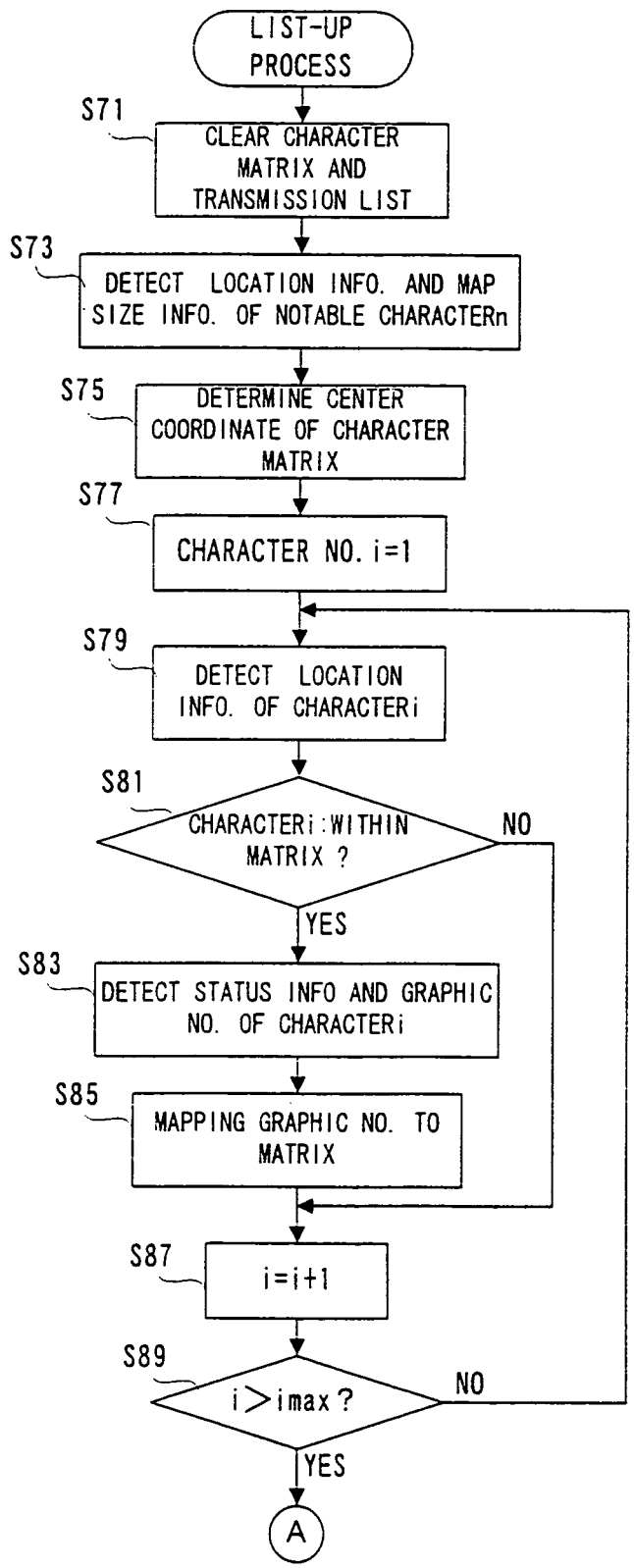
FIG. 28 is a flowchart showing yet another part of a processing of the game server.
Figure 29:
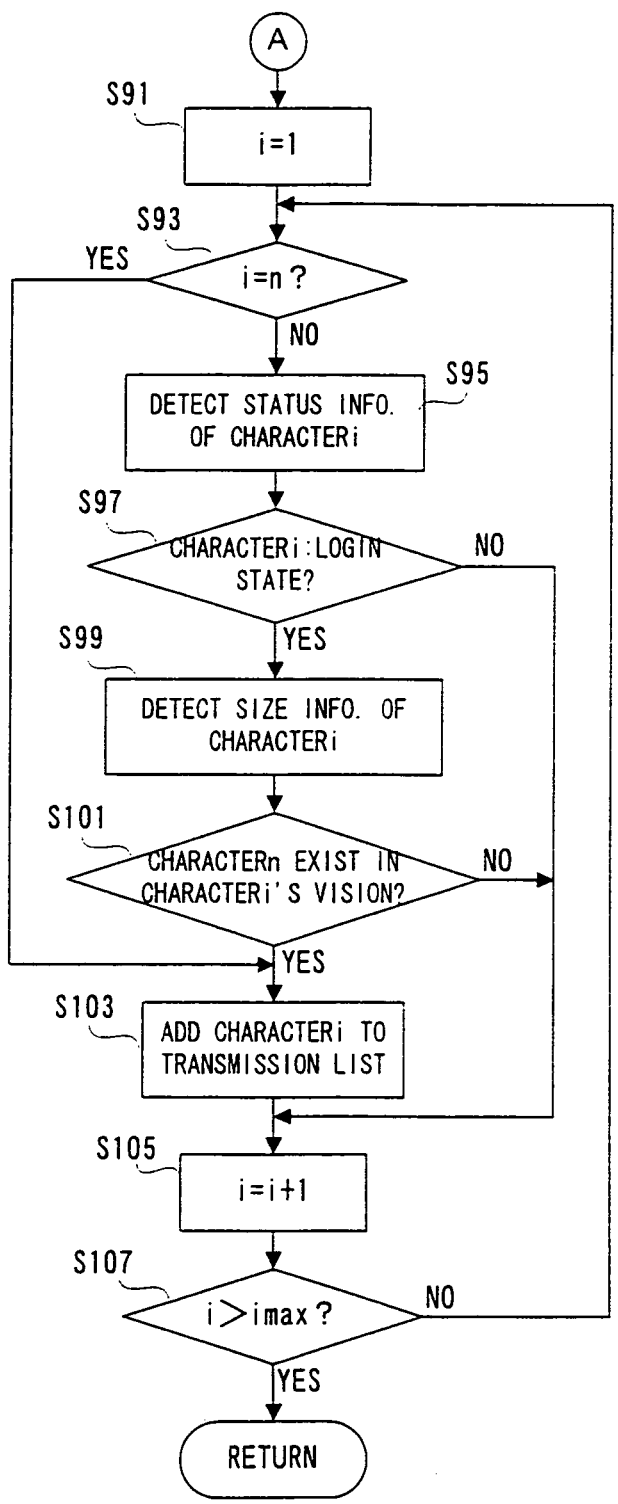
FIG. 29 is a flowchart showing another part of a processing of the game server.

The list-up processes in the steps S35, S45, S53, or S63 follow subroutines shown in FIGS. 28 and 29. Firstly, a content of the character matrix and the transmission List formed in the work area 24d are cleared in a step S71. In a step S73, character data (character n) of the player who transmitted the log-in request, the log-out request, the move request or the size change request is specified from the character data storing area 24c, and the position information and the map size information are detected from the specified character data. In a subsequent step S75, a center coordinate of the character matrix formed in the work area 24d shown in FIG. 3 is determined based on the position information detected in the step S73. The center coordinate of the character matrix is coincident with the coordinate included in the detected position information, and a size of the character matrix is twice the size of a map size which is constantly bigger than the other, i.e. size 1. Due to this, the center coordinate and the size of the character matrix are determined as shown in FIG. 22.

Once the center coordinate and the size of the character matrix are determined, a character number i is set to "1" in a step S77, and the position information is detected from the character data of the character i (specified from the character data storing area 24c) in a step S79. In a step S81, it is determined whether or not the character i is included within a range of the character matrix based on the position information detected in the step S79, if it is determined NO, then the process directly proceeds to a step S87. On the other hand, if it is determined YES in the step S79, the status information and the graphic number are detected from the character data of the character i in a step S83, the graphic number is mapped to the character matrix in a step S85, and then the process proceeds to the step S87. In the step S85, more specifically, an extension identifier determined based on the position information (direction of the character i) and the status information are added to the graphic number, and the graphic number to which the extension identifier is added is mapped to the character matrix according to the position information (coordinate of the character i) detected in the step S79.

The character number i is incremented in the step S87, and the incremented character number i is compared with a maximum character number imax in a subsequent step S89. If i≤imax is herein true, the processes of steps S79 to S87 are repeated. Due to this, the graphic number of a plurality of characters present in a neighborhood of the character n is mapped to the character matrix. According to FIG. 22, out of characters i, i', i'', the graphic number of the characters i, i'', and n are mapped to the character matrix.

When i>imax is established, the process proceeds from the step S89 to a step S91, the character number i is once again set to "1". In a subsequent step S93, it is determined whether or not the character i is coincident with the character n. If YES is determined, the character ID of the character i (=n) is added onto the transmission list in a step S103, and the process proceeds to a step S105. That is, the character ID of the character n is unconditionally added onto the transmission list.

In the meantime, if NO is determined in the steps S93, the status information is detected from the character data of the character i (stored in the character data storing area 24c) in the step S95, and in a step S97, it is determined in which state, log-in state or log-out state, the character i is. If the log-out state is determined, the process proceeds to a step S105 without carrying out a transmission list addition process. In contrast, if the log-in state is determined, the man size information is detected from the character data of the character i in a step S99, and it is determined whether or not the character n is present within a visual range of the character i in a step S101. More specifically, it is determined whether or not the coordinate of the character n is present within a map size range of the character i based on the map size information and the position information of the detected character i. In addition, if YES is determined, the process proceeds to the step S105 via the transmission list addition process in the step S103, and if NO is determined, the process directly proceeds to the step S105.

The character number i is incremented in the steps S105, and the incremented character number i is compared with a maximum character number imax in a subsequent step S107. If i≤imax is true, processes of steps S93 to S107 are repeated. Due to this, the character ID of the character n and the character ID of the character having the character n present in a visual range are added onto the transmission list. According to FIG. 22, it is only the character i that has the character n present in the visual range. Due to this, the character ID of the character n and i are added onto the transmission list. If i>imax is determined, the process returns to a routine on a higher hierarchy.

In the above steps of S37, S47, and S55, the map data is created by carving out the geography matrix and the character matrix with regard to each player thus registered on the transmission list. On the other hand, in the step S65, the map data is created by carving out the geography matrix and the character matrix with regard only to the player who transmitted the size change request. In either case, a size of the map data follows the map size information of the transmission destination player, and the graphic number of the transmission destination player is assigned to the center coordinate of the map data.

Figure 30:
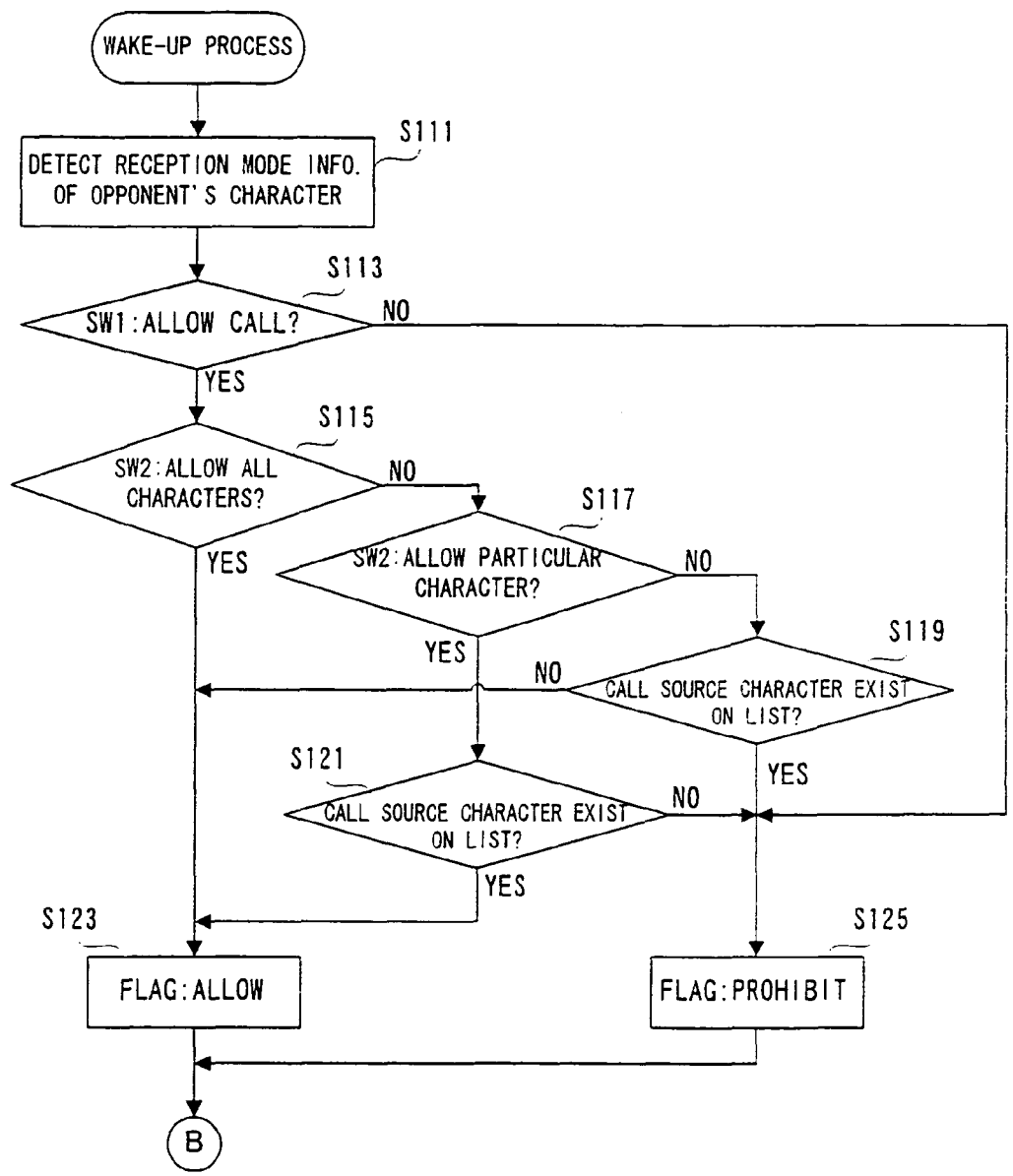
FIG. 30 is a flowchart showing still another part of a processing of the game server.
Figure 31:
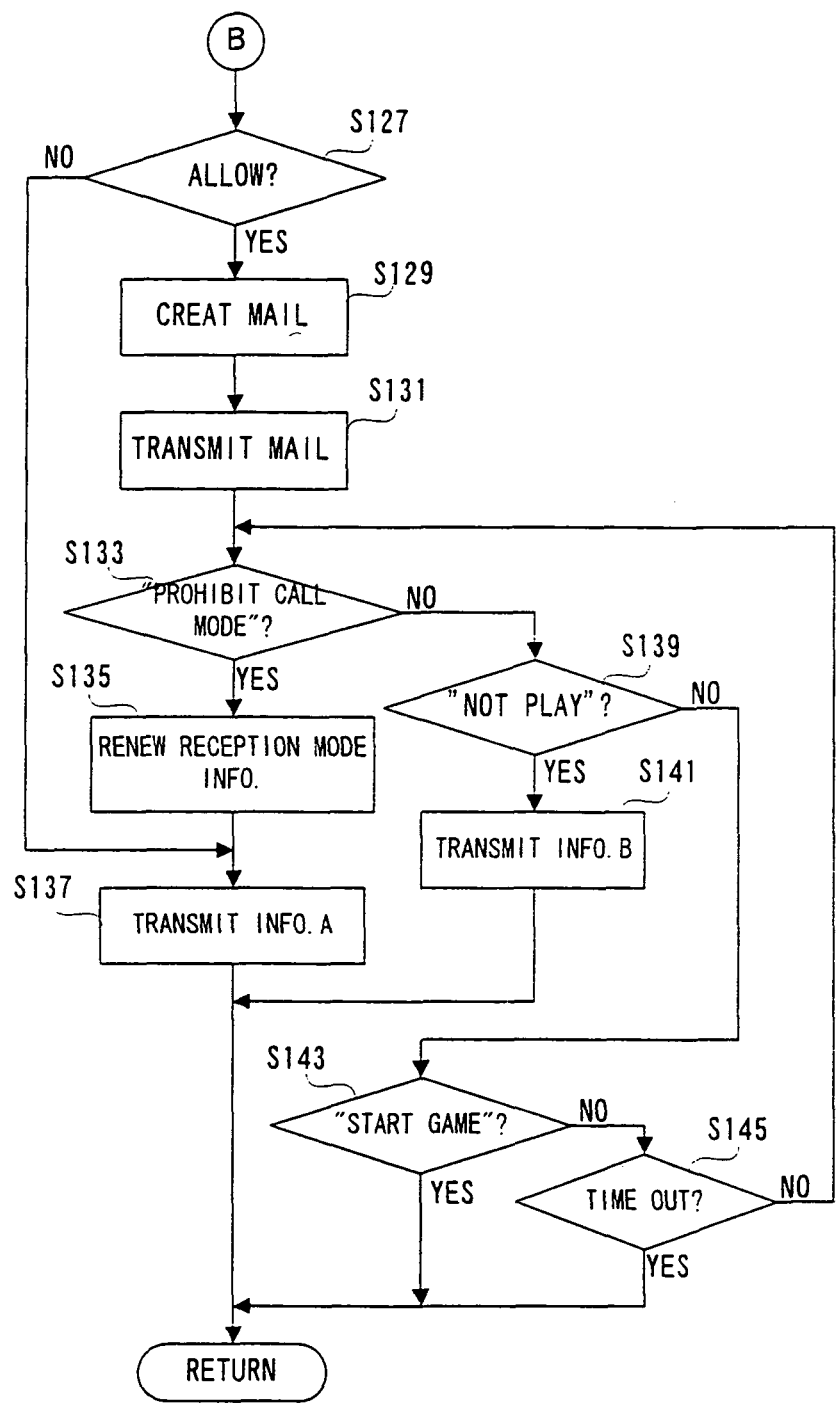
FIG. 31 is a flowchart showing yet another part of a processing of the game server.

Subroutines shown in FIGS. 30 and 31 are processed In the step S19 shown in FIG. 23. In a step S111, the character data of the transmission source player is specified from the character data storing area 24c based on the character ID included in the "WAKE-UP" information, the character data of an opponent to be awaken is specified based on the position information included in the specified character data (coordinate and direction) and the reception mode information is detected from the specified character data. In a step S113, it is determined whether or not a content of the switch 1 of the detected reception mode information is "ALLOW CALL", if NO is determined an allow/prohibit flag is set to "prohibit" in a step S125. On the other hand, if YES is determined in the step S113, a content of the switch 2 is determined in steps of S115 and S117.

If the content of the switch 2 is "ALLOW ALL CHARACTERS", YES is determined in the step S115, and the allow/prohibit flag is set to "ALLOW" in a step S123. If the content of the switch 2 is "ALLOW PARTICULAR CHARACTER ONLY", the process proceeds from the step S117 to a step S121, it is determined whether or not a calling source character is registered onto the character list of the reception mode information detected in the step S111. If YES is herein determined, the allow/prohibit flag is set to "ALLOW" in the step S123. However, if NO is determined, the allow/prohibit flag is set to "PROHIBIT" in the step S125. If the content of the switch 2 is "ALLOW EXCEPT FOR PARTICULAR CHARACTER", the process proceeds from the step S117 to a step S119, and it is determined whether or not the call source character is registered onto the character list of the reception mode information detected in the step S111. If NO is herein determined, the allow/prohibit flag is set to "ALLOW" in the step S123. However, if YES is determined, the allow/prohibit flag is set to "PROHIBIT" in the step S125.

Upon completion of the allow/prohibit flag setting in this manner, a setting state of the allow/prohibit flag is determined in a step S127. In addition, if the setting state is "PROHIBIT", the information A is transmitted in a step S137, and then the process returns to a routine on a higher hierarchy. As a result of transmitting the information A, a message of "SLEEP WELL, NO SIGN OF WAKING" is displayed on the display 38 of the call source portable communication terminal 30.

In the meantime, if the setting state is "ALLOW", dedicated game-use mail (log-in operation request) is created in a step S129, and the created dedicated game-use mail is transmitted to the opponent's portable communication terminal 30 in a step S131. The dedicated game-use mail is a mail to request the opponent to operate the log-in, and a call source character name is therein included. If the opponent selects "CHANGE TO CALL PROHIBIT MODE" in response to the dedicated game-use mail, the process proceeds from a step S133 to a step S135. In this step, character data of the opponent is detected from the character data storing area 24c, and the switch 1 of the reception mode information included in the detected character data is renewed to "PROHIBIT CALL". Upon completion of the renewal process, the information A is transmitted in the step S137, and then the process returns to a routine on a higher hierarchy after transmitting.

If the opponent selects "NOT PLAY NOW" in response to the dedicated game-use mail, the process proceeds from a step S139 to a step S141, and the information B is transmitted to the call source portable communication terminal 30. As a result of the transmission of the information B, a message "ZZZ . . . WAKE UP SOON? MAYBE NOT" is displayed on the display 38 of the call source portable communication terminal 30. Upon completion of the transmission of the information B, the process returns to a routine on a higher hierarchy.

If either the opponent selects "START GAME" or a time-out occurs while the opponent does not select anything in response to the dedicated game-use mail, YES is then determined in a step S143 or S145, and the process directly returns to a routine on a higher hierarchy. However, when "START GAME" is selected, the log-in request is transmitted from the portable communication terminal 30, and the game starts as a result of the log-in process in the step S3 shown in FIG. 23.

Next, description are herein made with regard to processes of a CPU 48 provided in the portable communication terminal 30 with referring to flowcharts shown in FIG. 32 to FIG. 46.

Firstly, the CPU 48 determines whether or not there is a presence or an absence of a signal reception from outside and a key operation of the player in respective steps of S151, S153 and S155. Upon receipt of the signal from outside, the process proceeds from a step S151 to a step S157, and determines whether or not the received signal is a mail signal or a call signal for a telephone communication. If the received signal is the call signal, the process proceeds to a step S159, and a telephone communication process is carried out. In a step S161, it is determined whether or not the telephone communication is completed. If NO is determined, the process returns to the step S159 and the telephone communication process is repeated. However, if YES is determined, the process proceeds to the step S151.

If the received signal is mail signal, it is determined whether or not the mail signal is a normal signal or a dedicated game-use signal in a step S165, and if the normal signal is present, the process returns to the step S15 through a normal mail process in a step S167. On the other hand, if the received mail signal is the dedicated game-use mail, a game mail process is carried out in a step S169 and a state of a name start flag is determined in a step S171. If the game start flag is herein a reset stare, the process returns to the step S151. However, if the game start flag is a set state, the log-in process, the game process and the log-out process are carried out in steps S173, S175 and S177, and then the process returns to the step S151.

If the player sets a cursor to "CHANGE RECEPTION MODE" by the cross key 40c and the presses the A button 40a in a menu screen shown in FIG. 10, the process proceeds from a step S153 to a step S163 so as to carry out a reception mode change process. Upon completing, the process returns to the step S151. On the other hand, if the player selects "START GAME" by the cross 40c and the A button 40a on the menu screen shown in FIG. 10, YES is determined in a step S155, and then the process proceeds to the step S173.

Figure 33:
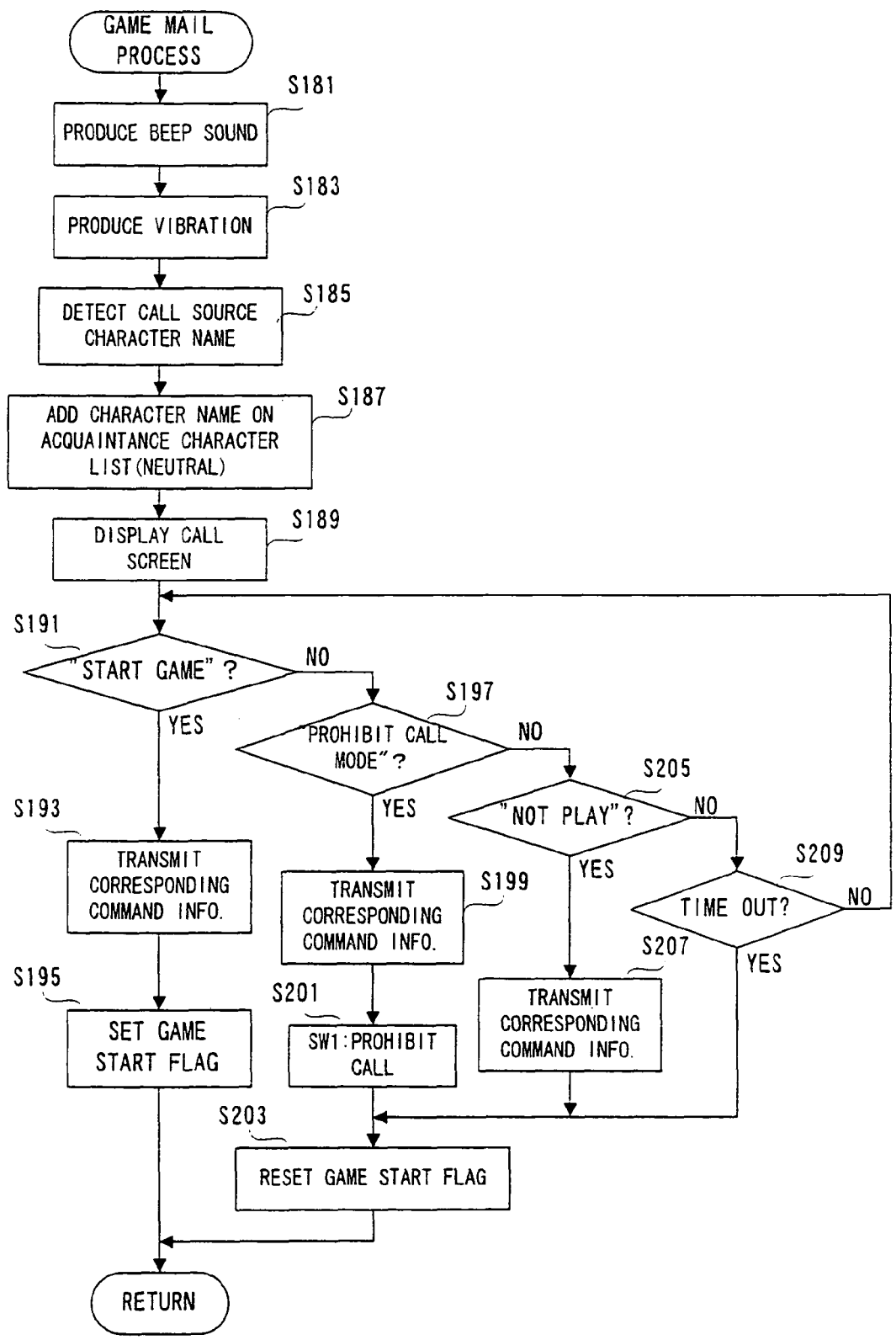
FIG. 33 is a flowchart showing another part of a processing of the portable communication terminal.

The game mail process in the step S169 follows a subroutine shown in FIG. 33. Firstly, a beep sound is produced through a call-use speaker 54 in a step S181, and a vibration is produced by a vibration motor 52 in a step S183. A call source character name is detected from the received dedicated game-use mail in a step S185, and the detected character name is added onto a sub list of "NEUTRAL CHARACTER" formed in the work area 50c shown in FIG. 6 in a step S187. It is noted that in a case that the detected character name is already registered on the character list, the process in the step S187 is not carried out.

Upon completion of the process in the step S187, a call screen shown in FIG. 11 is displayed on the display 38 in a step S189, and it is determined which menu items, "START GAME", "NOT PLAY NOW" and "CHANGE TO CALL PROHIBIT MODE" were selected by the player in steps of S191, S197, and S205.

If the cursor is set to "START GAME" by the cross key 40c and the A button is pressed, the process proceeds from the step S191 to a step S193, and command information corresponding to the selected menu item is transmitted to the game server 20. Subsequently, the game start flag is set in a step S195, and then the process returns to a routine on a higher hierarchy. When "CHANGE TO CALL PROHIBIT MODE" is selected by the cross key 40c and the A button 40a, YES is determined in the step S197, the command information corresponding to the menu item is transmitted to the game server 20 in a step S199, and "PROHIBIT CALL" is set to the switch 1 of the reception mode information stored in the work area 50c in a step S201. Subsequently, the game start flag is reset in a step S203, and then the process returns to a routine on a higher hierarchy.

When "NOT PLAY NOW" is selected by the cross key 40c and the A button 40a, YES is determined in the step S205, the command information corresponding to the menu item is transmitted to the game server 20 in a step S207, and then the process proceeds to the step S203. If a time-out occurs while the player does not select any menu item, YES is determined in a step S209, and the process directly proceeds to the step S203.

It is noted that on the game server 20 side, determination processes in the steps of S133, S139 and S143 shown in FIG. 31 are carried out based on the command information transmitted in the steps of S193, S199 and S207.

Figure 34:
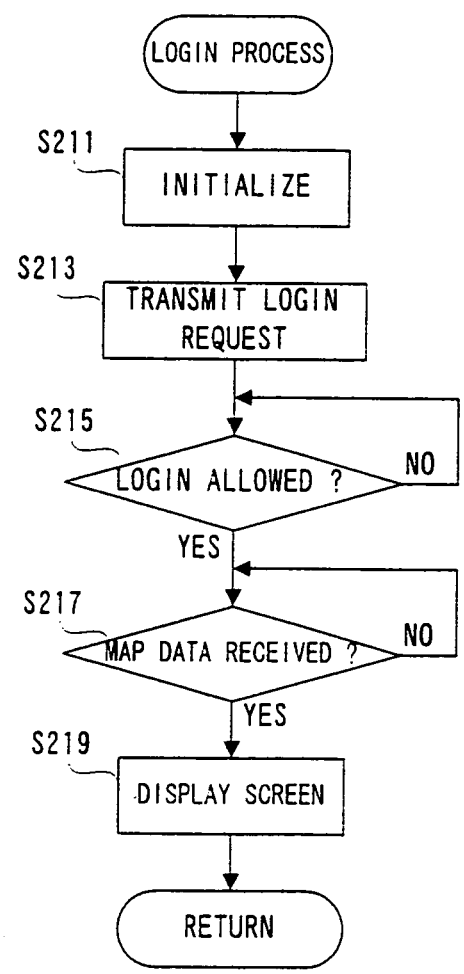
FIG. 34 is a flowchart showing still another part of a processing of the portable communication terminal.

The log-in process in the step S173 follows a subroutine shown in FIG. 34. Firstly, an initialization is carried out in a step S211, the log-in request is transmitted to the game server 20 in a step S213. In response to the log-in request, the game server 20 sends back the log-in permission and the map data (steps S33, S37). Due to this, it is determined whether the log-in permission and the reception of the map data are present or absent in respective steps of S215 and S217 on the portable communication terminal 30 side, and the process proceeds to a step S219 upon receipt of the map data. In the step S219, a virtual space (game screen) as shown in FIG. 11 or FIG. 12 is displayed on the display 38 on the basis of the received map data. Upon completion of the display process, the process returns to a routine on a higher hierarchy.

Figure 35:
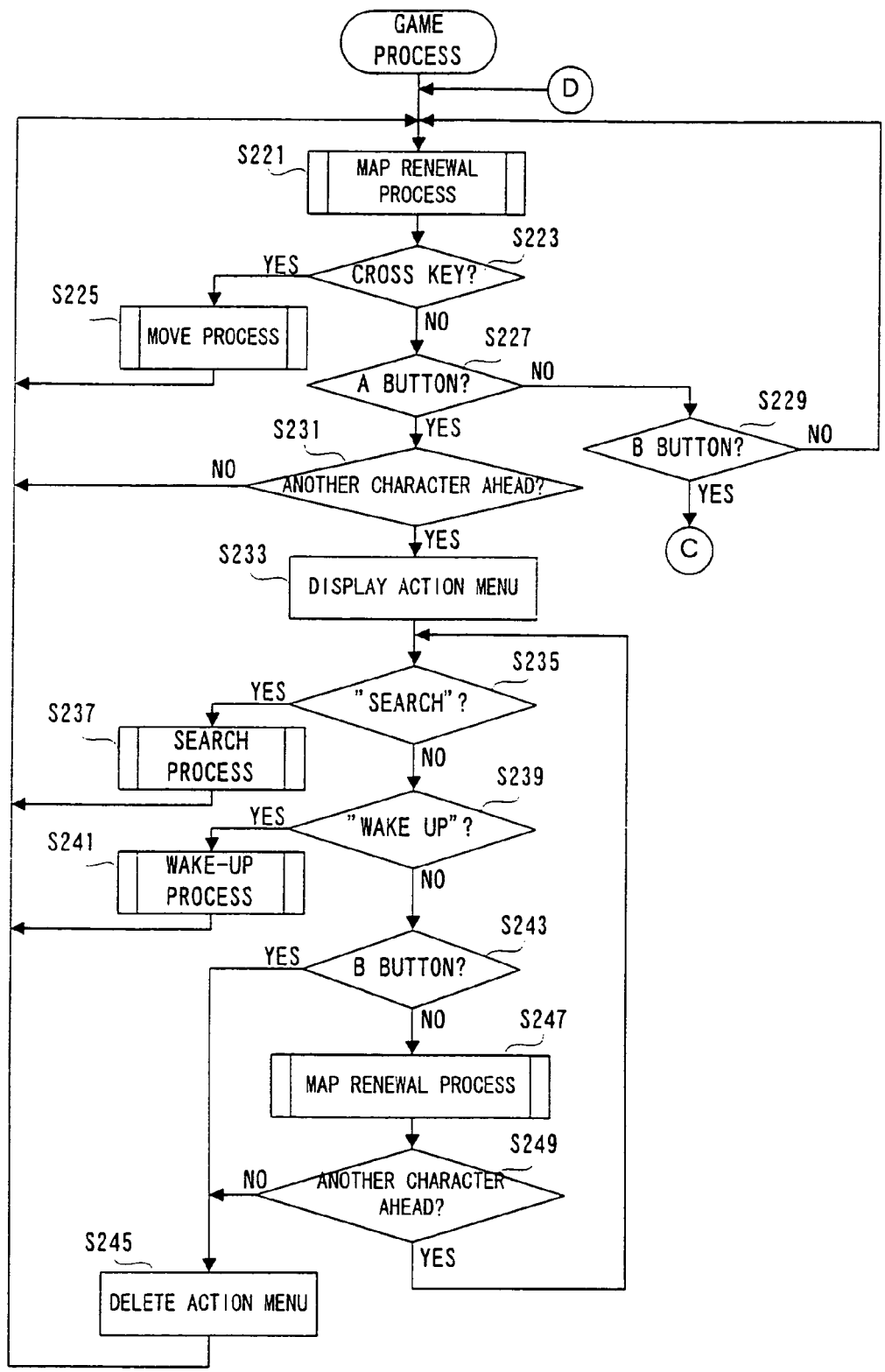
FIG. 35 is a flowchart showing yet another part of a processing of the portable communication terminal.
Figure 36:
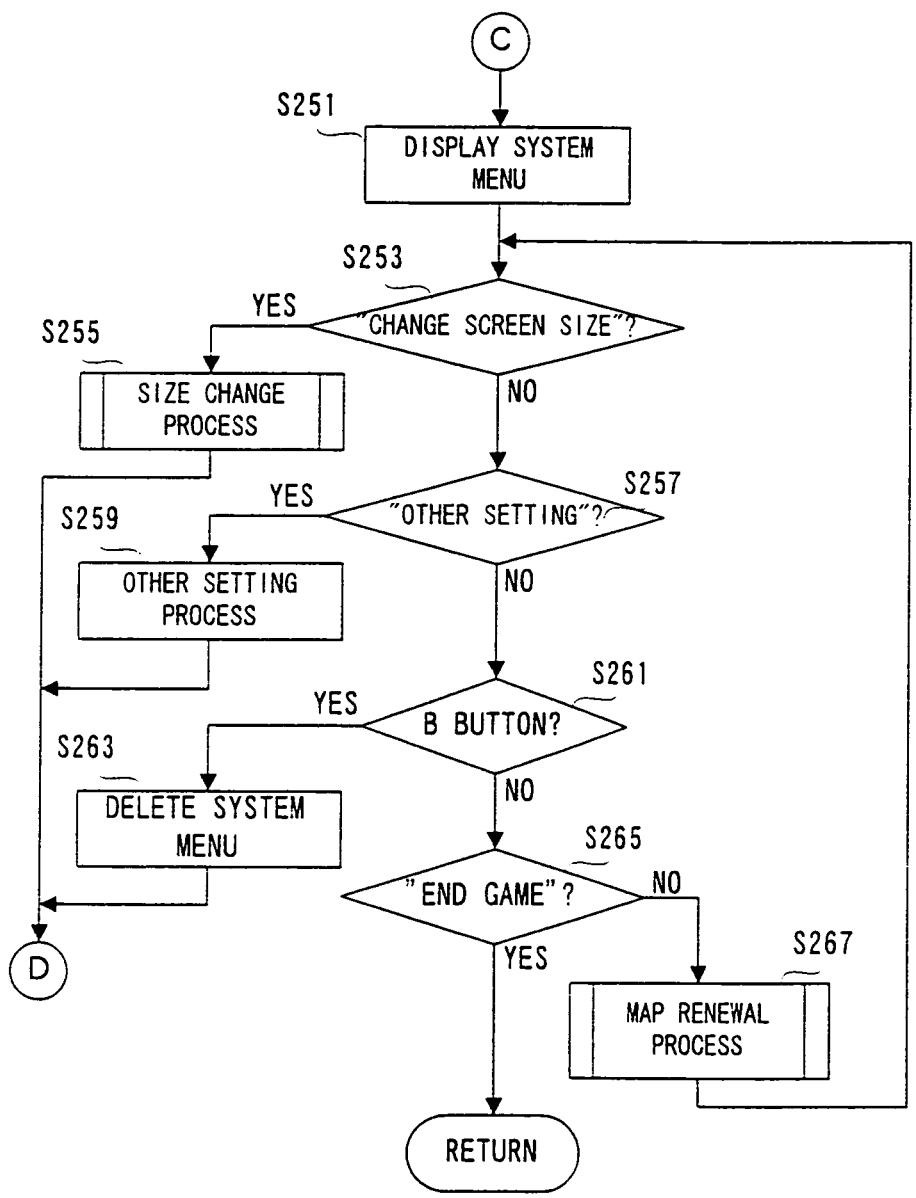
FIG. 36 is a flowchart showing another part of a processing of the portable communication terminal.

The game process in the step S175 follows subroutines shown in FIG. 35 and FIG. 36. Firstly a map renewal process is carried out in a step S221, and it is determined whether or not an operation of the cross key 40c, the A button 40a or the B button 40b is present or absent in respective subsequent steps of S223, S227 or S229. When the cross key 40c is operated, a move process is carries out in a step S225, and upon completion of the display process, the process returns to the step S221.

When the A button 40a is pressed, the process proceeds to a step S231, it is determined whether another character is present or absent ahead of his own character. If NO is determined, the process returns to the step S221. However, if YES is determined, the process proceeds to a step S233 so as to display the action menu screen shown in FIG. 13 displayed on the display 38.

If the player sets the cursor to "SEARCH" by the cross key 40c and presses the A button 40a, YES is determined in a step S235, and a search process is carried out in a step S237. Upon completion of the process, the process returns to the step S221. On the other hand, if the player sets the cursor to "WAKE-UP" by the cross key 40c and presses the A button 40a, YES is determined in a step S239, and an awake process is carried out in a step S241. Upon completion of the process, the process returns to the step S221. On the other hand, if the player presses the B button 40b, YES is determined in a step S243, the action menu screen is detected in a step S245, and the process returns to the step S221.

While neither operation is done by the player, a map renewal process is carried out in a step S247, and it is determined whether or not there is another character is present ahead of his own character in a step S249. In addition, if YES is determined, the process returns to the step S235. However, if NO is determined, the action menu screen is deleted in the step S245, and then the process returns to the step S221. Therefore, when another character is away from ahead of his own character, the action menu screen is deleted without operating the B button 40b.

If the player operates the B button 40b while the action menu screen is not displayed, YES is determined in a step S229, and a system menu screen shown in FIG. 18 is displayed on the display 38 in a step S251. If the player sets the cursor to "CHANGE SCREEN SIZE" by the cross key 40c and presses the A button 40a, YES is determined in a step S253, and a size change process is carried out in a step S255. Upon completion of the process, the process returns to the step S221. If the player sets the cursor "OTHER SETTING PROCESS" by the cross key 40c and presses the A button 40a, YES is determined in a step S257, the other setting process is carried out in a step S259, and then the process returns to the step S221. If the player presses the B button 40b, YES is determined in a step S261, the system menu screen is deleted in a step S263, and then the process returns to the step S221. If the player sets the cursor to "END GAME" and presses the A button 40a, YES is determined in a step S265, and then the process returns to a routine on a higher hierarchy.

While neither key operation is done by the player, the map renewal process is carried out in a step S267, and the process returns to the step S253. Due to this, another character moves on the game screen while the system menu screen is being displayed.

Figure 37:
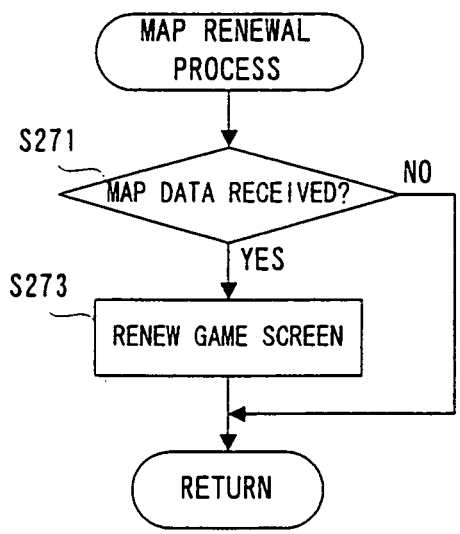
FIG. 37 is a flowchart showing still another part of a processing of the portable communication terminal.

The map renewal processes in the steps of S221, S247, or S267 follow a subroutine shown in FIG. 37. Firstly, it is determined whether or not the map data is newly received in a step S271, if NO is determined, the process directly returns to a routine on a higher hierarchy. However, if YES is determined, the game screen is renewed in a step S273. That is, the map data stored in the work area 50c shown in FIG. 6 is renewed by the map data received at this time. Game screen data created based on the renewed map data and the graphic data stored in the graphic data storing area 50b is developed on the display area 50d. Due to this, the game screen of the display 38 is renewed. Upon completion of such the processes, the process returns to a routine on a higher hierarchy.

Figure 38:
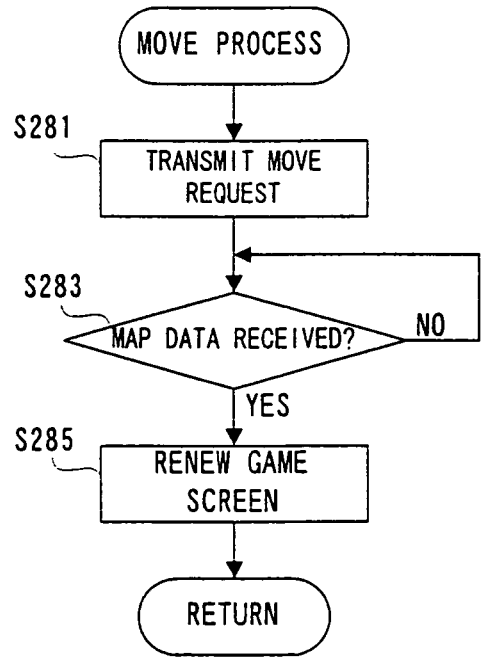
FIG. 38 is a flowchart showing yet another part of a processing of the portable communication terminal.

A move process in the step S225 follows a subroutine shown in FIG. 38. Firstly, a move request including his own character ID and move destination information (any of up, down, right, left) is transmitted to the game server 20 in a step S281. On the game server 20 side, the renewal process of the position information corresponding to the request source player (step S51) and the sending-back process of the new map data (step S5) are carried out. Upon sending back the map data, YES is determined in a step S283, and in a step S285, the game screen is renewed according to the same manner as in the above step S273. Upon completion of the renewal, the process returns to a routine on a higher hierarchy.

Figure 39:
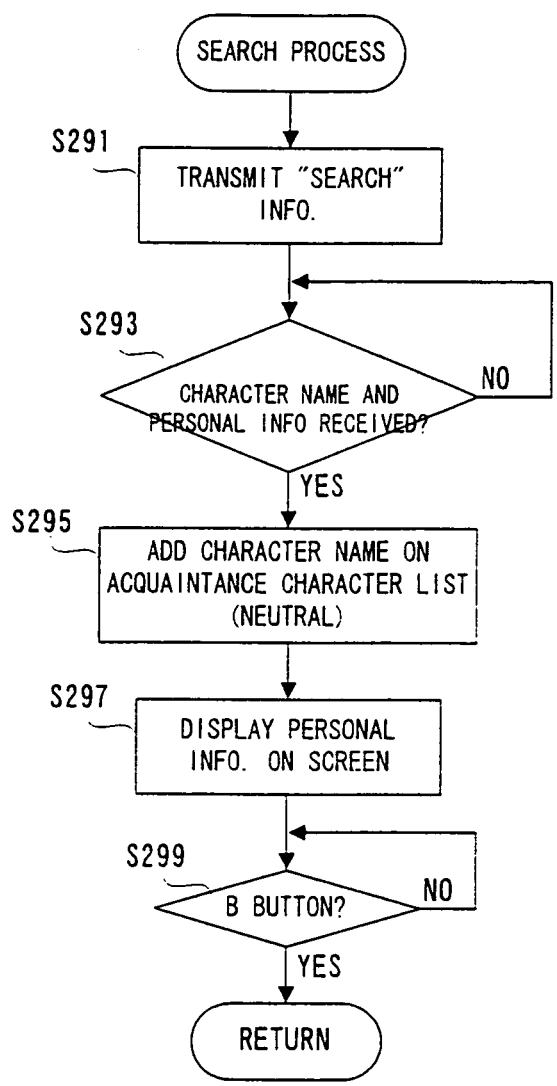
FIG. 39 is a flowchart showing another part of a processing of the portable communication terminal.

The search process in the step S237 follows a subroutine shown in FIG. 39. Firstly, the "SEARCH" information including his own D is transmitted in a step S291. Since a detect/sending-back process of the character name and the personal information is carried out on the game server 20 side (step S27), it is determined whether or not the reception of the character name and the personal information is present or absent in a subsequent step S293. If YES is determined, the process proceeds to a step S295 so as to register the received character name onto a sub list of "NEUTRAL CHARACTER" shown in FIG. 6. In a step S297, personal information screen data based on the received personal information is developed on the display area 50d shown in FIG. 6 so as to display a personal information screen on the display 38 as shown in FIG. 14. It is determined whether or not the B button 40b is operated in a step S299 and when the B button 40b is pressed, the process returns to the routine on a higher hierarchy. It is noted that as described above, the addition process in the step S295 is carried out when the same character name is not present on the friend character list.

Figure 40:
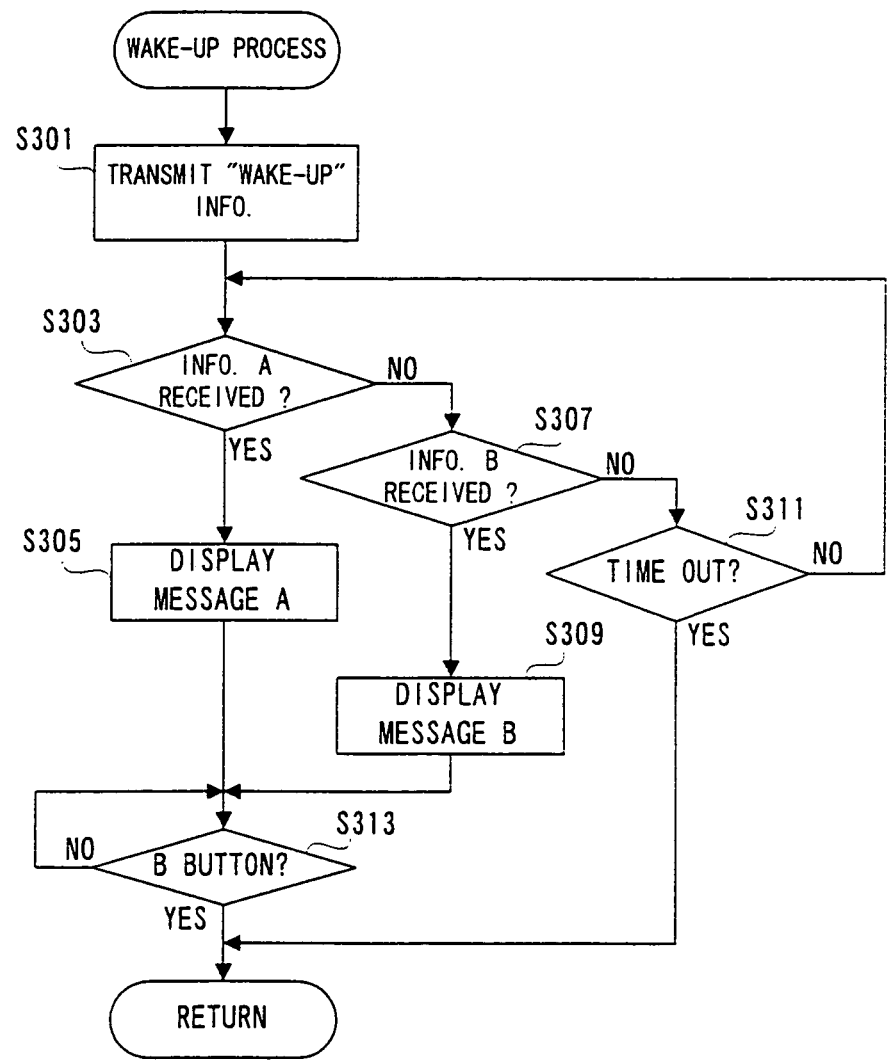
FIG. 40 is a flowchart showing still another part of a processing of the portable communication terminal.

The awake process in the step S241 follows a subroutine shown in FIG. 40. The "WAKE-UP" information including his own character ID is transmitted in a step S301. Since the game server 20 sends back either the information A or the information B in response to the "WAKE-UP" information (step S137 or S141), it is determined whether a reception of the information A or the information B is present or absent in the step of either S303 or S307 after transmitting the "WAKE-UP" information. When the information A is sent back, the process proceeds to a step S305, and a message "SLEEP WELL, NO SIGN OF WAKING . . . " is displayed on the display 38 as shown in FIG. 15. When the information B is sent back, the process proceeds to a step S309, and a message "ZZZ . . . WAKE UP SOON? MAYBE NOT" is displayed on the display 38 as shown in FIG. 16. It is determined whether the B button 40b is operated or not in a step S313, and in a case that the B button 40b is pressed, the process returns to the routine on a higher hierarchy. It is noted that if a time-out occurs while neither the information A nor the information B is received, YES is determined, and then the process directly returns to a routine on a higher hierarchy in a step S311.

Figure 41:
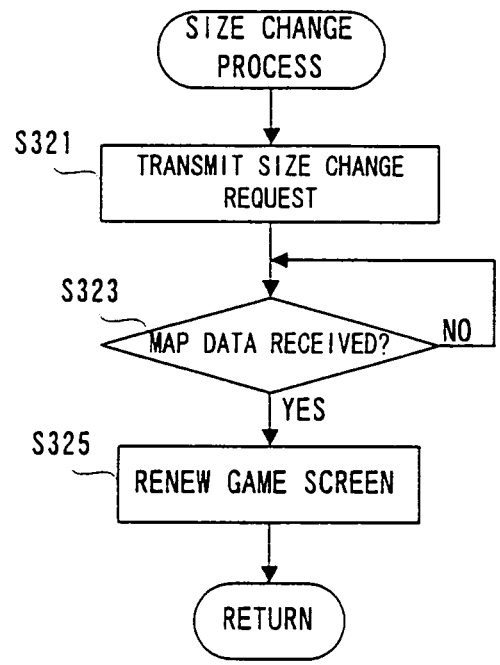
FIG. 41 is a flowchart showing yet another part of a processing of the portable communication terminal.

The size change process in the step S255 follows a subroutine shown in FIG. 41. Firstly, the size change request including his own character ID is transmitted co the game server 20 in a step S321. Since the game server 20 sends back the map data in response to the size change request (step S65), it is determined whether the map data reception is present or absent in a step S323. Upon receipt of the map data, the process proceeds to a step S325 so as to renew the game screen. That is, the map data stored in the work area 50c shown in FIG. 6 is renewed by the map data received at this time. The game screen data created based on the renewed map data and the graphic data in the graphic data storing area 50*b* is developed on the display area 50*d*. Due to this, the game screen of the display 38 is renewed. Upon completion of the renewal process, the process returns to a routine on a higher hierarchy.

Figure 32:
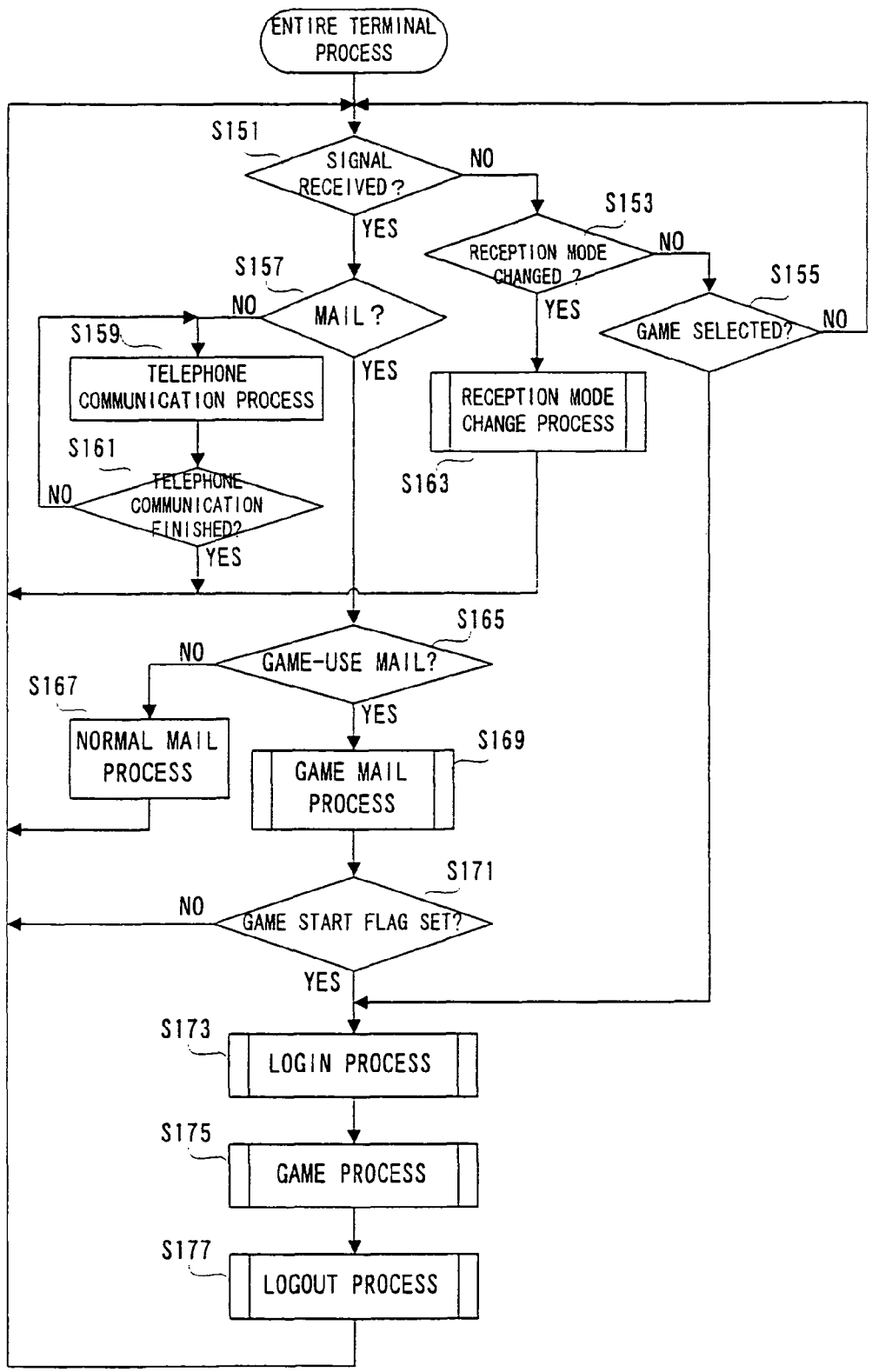
FIG. 32 is a flowchart showing one part of a processing of a portable communication terminal.
Figure 42:
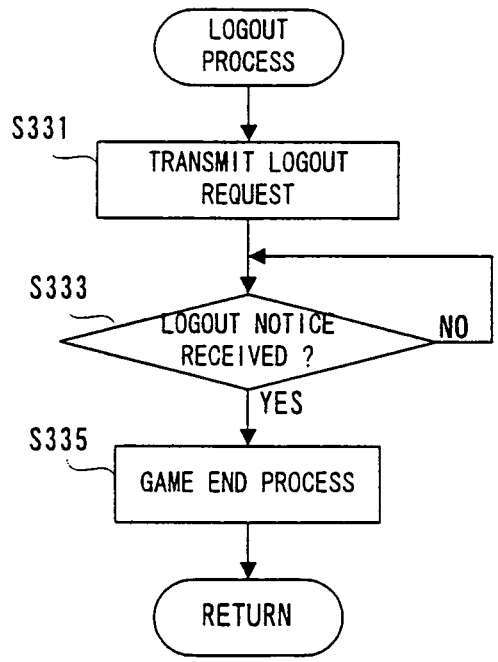
FIG. 42 is a flowchart showing another part of a processing of the portable communication terminal.

The log-out process in the step S177 shown in FIG. 32 follows a subroutine shown in FIG. 42. Firstly, the log-out request including his own character ID is transmitted to the game server 20 in a step S331. Since the game server 20 sends the log-out notice in response to the log-out request (step S43), it is determined whether the log-out notice is present or absent in a step S333. Upon receipt of the log-out notice, a game end process is carried out in a step S335. Subsequently, the process returns to a routine on a higher hierarchy.

Figure 43:
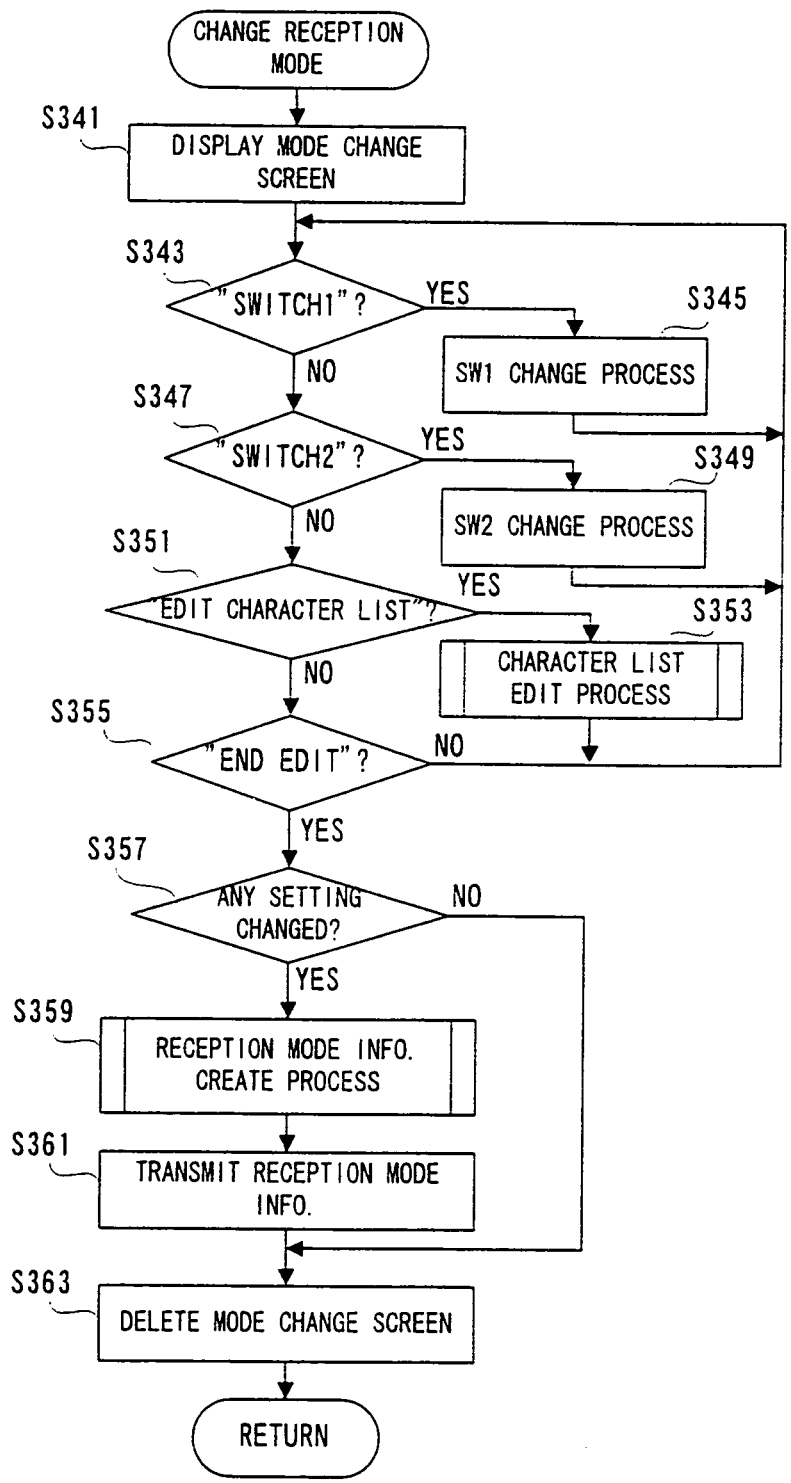
FIG. 43 is a flowchart showing still another part of a processing of the portable communication terminal.

The reception mode change process in the step S163 shown in FIG. 32 follows a subroutine in FIG. 43. Firstly, the reception mode setting screen shown in FIG. 19 is displayed on the display 38 in a step S341, and the cursor pointing at "SWITCH 1", "SWITCH 2", "EDIT CHARACTER LIST" or "END SETTING" is validated. Subsequently, it is determined which is selected, "SWITCH 1", "SWITCH 2", "EDIT CHARACTER" or "END SETTING" in respective steps of S343, S347, S351 and S355. If the player sets the cursor to "SWITCH 1" by the cross key 40*c* and presses the A button 40*a*, YES is determined in the step S343, and a SW1 change process is carried out in a step S345. On the other hand, if the player sets the cursor to "SWITCH 2" by the cross key 40*c* and presses the A button 40*a*, YES is determined in the step S347, and a SW2 change process is carried out in a step S349.

Referring to FIG. 19, the cursor pointing at "ALLOW CALL" or "PROHIBIT CALL" is validated in the SW1 change process, and the cursor pointing at "ALLOW ALL CHARACTERS", "ALLOW PARTICULAR CHARACTER ONLY" or "ALLOW EXCEPT FOR PARTICULAR CHARACTER" is validated in the SW2 change process. If the cursor is set to a desired menu item by the cross key 40*c*, the switch 1 or the switch 2 of the reception mode information shown in FIG. 6 by a menu item pointed at is renewed by the cursor. If the B button 40*b* is pressed, the process returns to the step S343 after validating the cursor pointing to "SWITCH 1", "SWITCH 2", "EDIT CHARACTER LIST" or "END EDIT".

If the player sets the cursor to "EDIT CHARACTER LIST" by the cross key 40*c* and presses the A button 40*a*, YES is determined in the step S351, and the character list edit process is carried out in a step S353. Upon completion of the character list edit process, the process returns to the step S343.

If the player sets the cursor to "END EDIT" by the cross key 40*c* and presses the A button 40*a*, the process proceeds from the step S355 to a step S357 so as to determine whether or not the setting is changed. If NO is determined, the process directly proceeds to a step S363 so as to delete the mode change screen, and then returns to a routine on a higher hierarchy. On the other hand, if YES is determined in the step S357, a reception mode information creating process is carried out in a step S359. The created reception mode information is transmitted to the game server 20 with his own character ID in a subsequent step S361. Upon completion of the transmission, the mode change screen is deleted in the step S363, and then the process returns to a routine on a higher routine.

Figure 44:
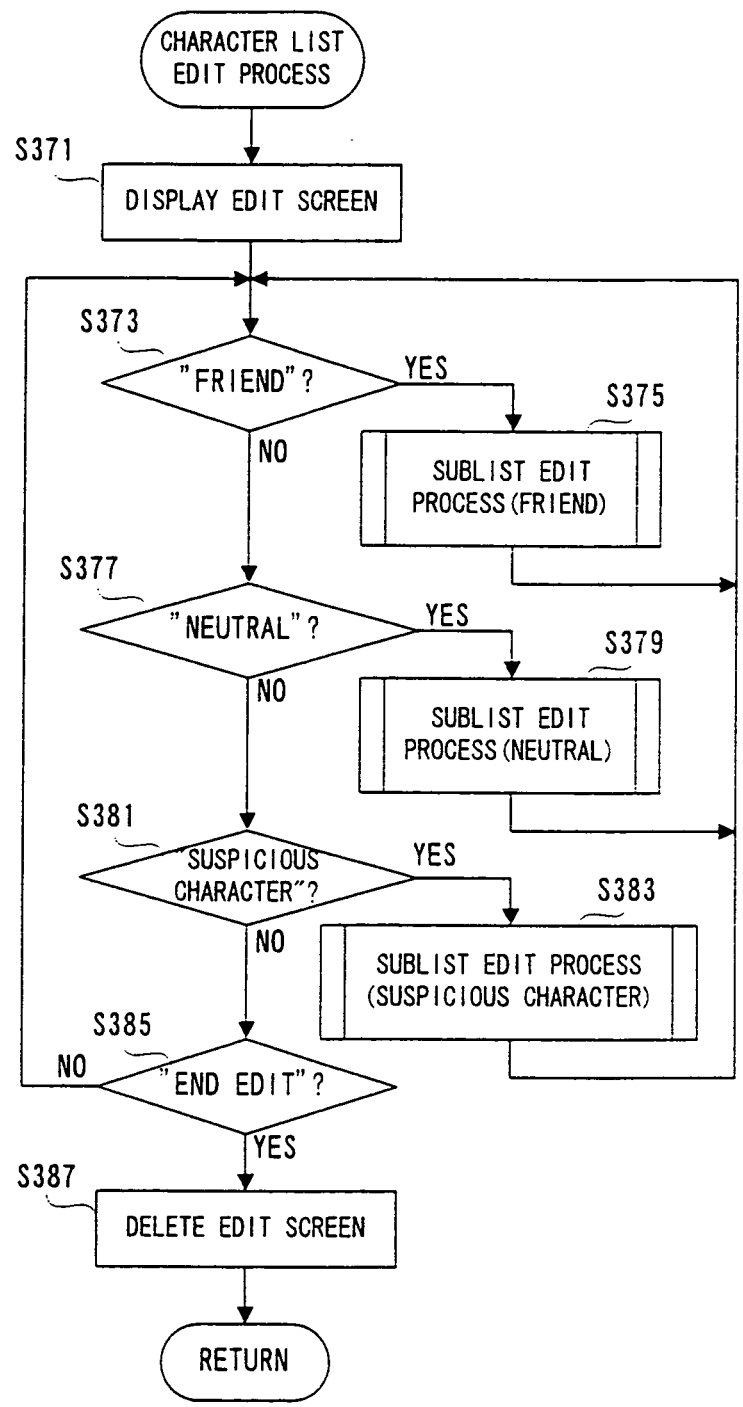
FIG. 44 is a flowchart showing yet another part of a processing of the portable communication terminal.

The character list editing process in the step S353 follows a subroutine shown in FIG. 44. Firstly, the character list editing screen shown in FIG. 20 is displayed in a step S371, and it is determined which is selected, "FRIEND", "NEUTRAL", "SUSPICIOUS CHARACTER", or "END EDIT" in respective steps of S373, S377, S381 and S385.

If the A button 40*a* is pressed while the cursor is set to "friend", the process proceeds from the step S373 to a step S375 so as to carry out a sub list edit process with regard to the friend character. If the A button 40*a* is pressed while the cursor is set to "NEUTRAL", the process proceeds from the step S377 to a step S379 so as to carry out a sub list edit process with regard to the neutral character. If the A button 40*a* is pressed while the cursor is set to "SUSPICIOUS CHARACTER", the process proceeds from the step S381 to a step S383 so as to carry out a sub list edit process with regard to the "SUSPICIOUS CHARACTER". Upon completion of the steps of S375, S379 or S383, the process returns to the step S373. If the A button 40*a* is pressed while the cursor is set to "END EDIT", YES is determined in the step S385, the edit screen is deleted in a step S387, and then the process returns to a routine on a higher hierarchy.

Figure 45:
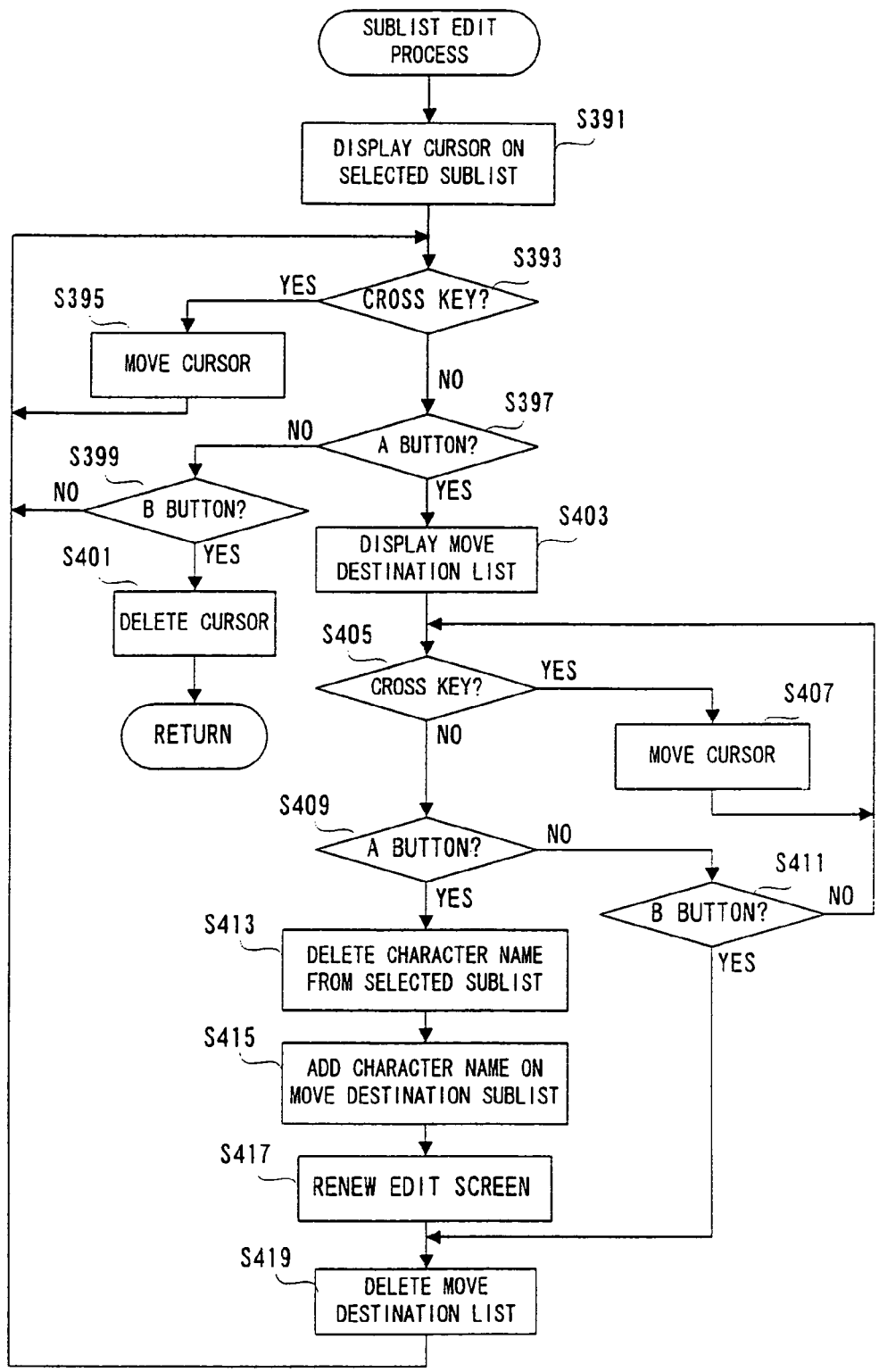
FIG. 45 is a flowchart showing another part of a processing of the portable communication terminal.

The sub list edit process shown in the steps of S375, S379 or S383 follows a subroutine shown in FIG. 45. In a step S391, the cursor is displayed on a selected sub list. If "FRIEND" is selected, the cursor is displayed in such a manner as to point any one of friend character names. If "NEUTRAL" is selected, the cursor is displayed in such a manner as to point any one of neutral character names. In addition, if "SUSPICIOUS CHARACTER" is selected, the cursor is displayed in such a manner as to point any one of suspicious character names. Herein if the player operates the cross key 40*c*, YES is determined in a step S393, the cursor is moved in a step S395, and then the process returns to the step S393. If the player operates the B button 40*b*, YES is determined in a step S399, the cursor in the sub list is deleted in a step S401, and then the process returns to a routine on a higher hierarchy.

If the player operates the A button 40*a*, YES is determined in a step S397, and a move destination list shown in FIG. 21 is displayed in the OSD manner in a step S403. The move destination list shown in FIG. 21 is a list to be displayed when the sub list editing is carried out with respect to the neutral character, and menu items are "FRIEND" and "SUSPICIOUS CHARACTER". The menu items of the move destination list are "NEUTRAL" and "SUSPICIOUS CHARACTER" in the sub list editing process with respect to the friend character, and the menu items of the move destination list are "FRIEND" and "NEUTRAL" in the sub list editing process with respect to the suspicious character.

If the player operates the cross key 40*c* while the move destination list is displayed, the process proceeds from a step S405 to a step S407, and moves the cursor present on the move destination list to a desired direction. Upon completion of the move process, the process returns to the step S405. On the other hand, if the player operates the B button 40*b*, YES is determined in a step S411, the move destination list is deleted in a step S419, and then the process returns to the step S393.

In the meantime, if the player operates the A button 40*a*, processes from a step S413 onward are carried out. Firstly, a character name at which the cursor points on a displayed sub list is deleted from a sub list corresponding to the work area 50*c* shown in FIG. 6 in the step S413. In a step S415, the character name deleted in the step S413 is added onto the sub list in FIG. 6 corresponding to the menu items at which the cursor points on the move destination list. Upon completion of moving the character in this manner, the character list edit screen is renewed in a step S417, the move destination list is deleted in a step S419, and then the process returns to the step S393.

Figure 46:
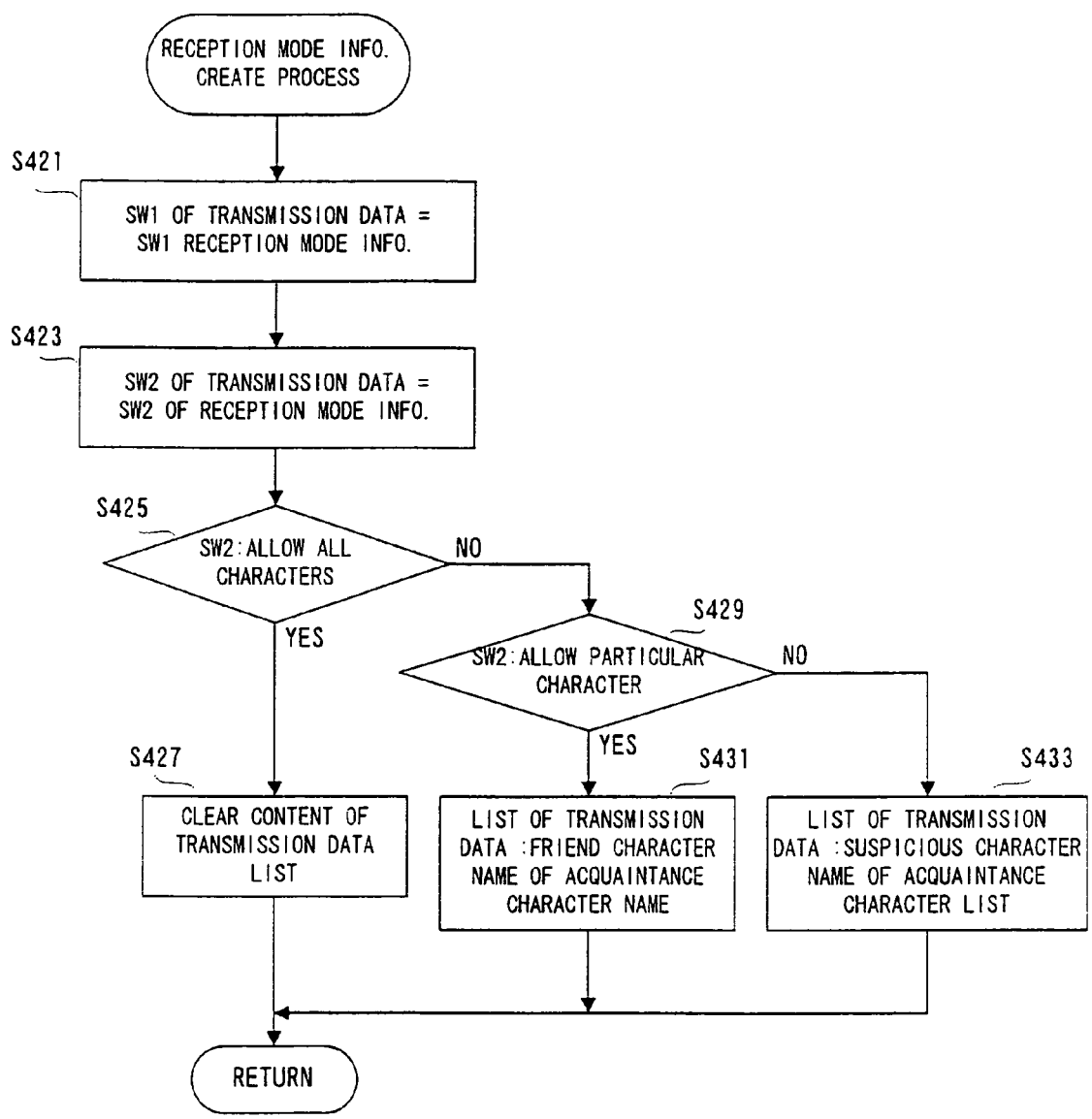
FIG. 46 is a flowchart showing still another part of a processing of the portable communication terminal.

The reception mode information create process in the step S359 shown in FIG. 43 follows a subroutine shown in FIG. 46. Firstly, contents of the switch 1 and the switch 2 of the reception mode information shown in FIG. 6 are set in columns of the switch 1 and the switch 2 of the reception mode information to be transmitted (transmission data) in steps of S421 and S423. The content of the set switch 2 is determined in steps of S425 and S429. If the content of the switch 2 is "ALLOW ALL CHARACTERS", the process proceeds from the step S425 to a step S427 so as to clear the character list columns of the transmission data. On the other hand, if the content of the switch 2 is "ALLOW PARTICULAR CHARACTER", the process proceeds from the step S429 to a steps S431 so as to set the friend character name registered on the acquaintance character list shown in FIG. 6 onto character list of the transmission data. On the other hand, if the content of the switch 2 is "ALLOW EXCEPT FOR PARTICULAR CHARACTER", the process proceeds from the step S429 to a step S433 so as to set the suspicious character name registered on the acquaintance character list shown in FIG. 6 onto the character list of the transmission data. Upon creating the transmission data in this manner, the process returns to a routine on a higher hierarchy.

As understood from above descriptions, a plurality of game players are registered in the game server 20 in advance, and the game server 20 provides a game for the portable communication terminal 30 of a player who logged-in through a communication network. At this time, the game server 20 transmits not only the graphic number which shows a character of a logging-in player but also the graphic number which shows a logging-out player to the portable communication terminal 30 of the logged-in player. On the display 38 of the portable communication terminal 30, each character image is displayed in such a manner as to be corresponding to the log-in/log-out. If "WAKE-UP" is herein selected with respect to the character in the middle of logging-out, the "WAKE-UP" information is applied from the portable communication terminal 30 to the game server 20.

The game server 20 determines the reception mode information of the character in the middle of logging-out, and if the content of the switch 1 is "PROHIBIT CALL", the information A is sent back to the transmission source of the "WAKE-UP" information. On the portable communication terminal 30 in receipt of the information A, a message "SLEEP WELL, NO SIGN OF WAKING UP" is displayed. In a case that the content of the switch 2 is "ALLOW PARTICULAR CHARACTER ONLY" and the character name of the "WAKE-UP" information transmission source is not registered on the character list even if the content of the switch 1 is "ALLOW CALL" or in a case that the content of the switch 2 is "ALLOW EXCEPT FOR PARTICULAR CHARACTER" and the character name of the "WAKE-UP" information transmission source is registered on the character list, the information A is sent back similar to above.

On the other hand, in a case that the content of the switch 1 and the switch 2 is "ALLOW CALL" and "ALLOW ALL CHARACTERS", that the content of switch 1 and the switch 2 is "ALLOW CALL" and "ALLOW PARTICULAR CHARACTER ONLY" and the request source character name is registered on the character list, or that the content of switch 1 and the switch 2 is "ALLOW CALL" and "ALLOW EXCEPT FOR PARTICULAR CHARACTER" and the request source character name is not registered on the character list, a log-in operation request is transmitted from the game server 20 to the opponent's portable communication terminal 30. On the display 38 of the portable communication terminal 30 in receipt of the log-in operation request, a call message including the call source character name is displayed.

Herein, if the player in receipt of the log-in operation request selects "START GAME", the game server 20 carries out the log-in process, and due to this, the portable communication terminal 30 of the player who selected the "START GAME" is provided with the game. If the player selects in receipt of the log-in operation request selects "NOT PLAY NOW", the game server 20 sends back the information B to the "WAKE-UP" information transmission source. On the display 38 of the portable communication terminal 30 in receipt of the information B, a message "ZZZ . . . WAKE UP SOON? MAYBE NOT" is displayed.

In this manner, when the player in the middle of logging-in selects the character of the player in the middle of logging-out, the "WAKE-UP" information is applied from the portable communication terminal 30 in the middle of logging-out to the game server 20, and the log-in operation request is transmitted to the portable communication terminal 30 in the middle of logging-out from the game server 20. Due to this, it is possible to simply and promptly play a game between the logging-in player and the logging-out player.

It is noted that although in this embodiment the game is proceeded by using a game screen formed of the graphic data of the geography and the character, the game may be proceeded by using screens formed of text data only as shown in FIG. 47 to FIG. 51.

FIG. 47 is a game menu screen, and a title "ONLINE GAME" is displayed at a center of the screen, and menu items such as "START GAME", "CHANGE RECEPTION MODE CHANGE" and "RETURN" are displayed at a lower portion of the screen.

FIG. 48 is a game screen, a present location name of "prairie" is displayed at an upper portion of the screen, a plurality of character names are displayed at a center of the screen, and below the screen, menu items are displayed at a lower portion of the screen. With regard to the character name, his own character name "NINTEN" is displayed at a top, and other character names present in the prairie "ROBIN", "WILL", "MARIAN" and "JOHN" are displayed below "NINTEN". Robin is in the middle of logging-out, and, status information of "sleeping" is displayed at the right of Robin. With respect to menu items, four items such as "MOVE", "SEARCH", "SET" and "END" are displayed.

If "MOVE" is herein selected, a move menu screen shown in FIG. 49 is displayed. According to FIG. 49, a command name "MOVE" is displayed at an upper portion of the screen, and a present location name "prairie" is displayed thereunder. Moving directions, that is, "NORTH", "SOUTH", "WEST" and "EAST" and locations names present in each direction, that is, "SELVA'S FOREST", "ORLEANS TOWN", "NORD WETLAND" and "BORHOKO MOUNTAIN" are displayed at a center of the screen. A menu item "RETURN" is displayed below the screen. If the desired move destination is herein selected, a game screen including a location name of the move destination and character names present in the move destination is displayed as shown in FIG. 48. If "RETURN" is selected, the process returns to the game screen shown in FIG. 48.

On the menu screen shown in FIG. 48, if an arbitrary character name and "SEARCH" are selected, a personal information screen shown in FIG. 50 is displayed. A name, gender and a state of the selected character are displayed at an upper portion of the screen, a profile (message) of the selected player is displayed at a center of the screen, and two menu items, that is, "SEARCH" and "RETURN" are displayed at a lower portion of the screen. If "WAKE-UP" is herein selected, a call screen shown in FIG. 51 is displayed on the portable communication terminal of Robin's player. According to FIG. 51, the title "ONLINE GAME" is displayed at an upper portion of the screen, a message, that is, "NINTEN IS WAKING YOU UP" is displayed at a center of the screen, and three menu items, that is, "START GAME", "NOT PLAY NOW", and "SET TO PROHIBIT CALL" are displayed at a lower portion of the screen. An operation when Robin's player selected each menu item is almost the same as in the above descriptions.

In this manner, even on a game screen formed of text data, if it is arranged in such a manner that a name of logging-out character's is displayed, and a log-in operation request is transmitted to a player when the character name is selected, it is possible to simply and promptly play a game with a logging-out player.

In addition, although in this embodiment as shown in FIG. 23, all processes, that is, log-in process, log-out process, move process, size change process, awake process, reception mode renewal process and personal information transmission process are carried out by one game server, it may be possible to divide the above mentioned processes by a plurality of servers present in a respectively distanced location. In this case, the game server is formed of the plurality of servers provided in a respectively different location.

Furthermore, in this embodiment, although a specific game content and kinds thereof are not described in detail, it is possible to define anything that the player can freely control characters appearing in the virtual space as "game".

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game management method of a game server which provides a game for a first game apparatus that is logged-in through a communication network, said first game apparatus being of a first player out of a plurality of players that are registered in said game server, wherein for each player first transmission identifying information indicating whether log-in operation requests are transmittable to the respective player is registerable with the game server, the method comprising:
    transmitting to said first game apparatus information identifying a second player out of the plurality of players that is not logged-in;
    transmitting, in response to user input on said first game apparatus requesting the second player to log-in, a log-in operation request to a second game apparatus of the second player, conditioned on any first transmission identifying information associated with the second player registered with the game server indicating that log-in requests for the second player are transmittable, the user input being received on said first game apparatus via a user interface that is displayed during a game play mode of the game; and
    returning a first message to said first game apparatus without transmitting the log-in operation request to said second game apparatus, conditioned on any first transmission identifying information associated with the second player registered with the game server indicating that log-in requests for the second player are not transmittable.

2. A game management method according to claim 1, wherein the first transmission identifying information is indicative of a prohibition.

3. A game management method according to claim 2, wherein for each player second transmission identifying information indicating whether log-in operation requests from each of the other players of the plurality of players are transmittable to the respective player is registerable with the game server, and further comprising returning the first message to said first game apparatus without transmitting said log-in operation request to said second game apparatus, conditioned on there being second transmission identifying information associated with the second player registered with the game server indicating that log-in requests from the first player are not transmittable.

4. A game management method according to claim 1, further comprising returning a second message to said first game apparatus in response to a log-in operation denial being returned from said second game apparatus responding to the log-in operation request.

5. A game management method according to claim 1, further comprising including identification information specifying the first player into the log-in operation request.

6. A game management method according to claim 1, wherein personal information is registerable in said game server for each player, and further comprising returning the personal information of the second player to said first game apparatus in response to a second selection signal for selecting the second player being received from said first game apparatus.

7. A game management method according to claim 1, further comprising:
    reading from a memory a first character signal representing a first character operated by the first player, a second character signal representing a second character operated by the second player, and a third character signal representing a third character operated by a third player already having logged-in at a time of the first player's log-in;
    adding the information identifying the second player to said second character signal such that a display manner of the second character in said first game apparatus is made different from display manners of the first character and the third character; and
    transmitting to said first game apparatus the first character signal, the second character signal to which said information identifying the second player is added, and said third character signal.

8. A game management method according to claim 1, further comprising:
    transmitting to the first game apparatus information identifying a given player that is registered in said game server but that is not logged-in, the information identifying the given player being displayable via the user interface on the first game apparatus in the form of a guide that is configured to enable the first player to select the given player based on the displayed information identifying the given player; and
    transmitting a log-in operation request to the game apparatus of the given player in response to a selection of the given player by the first player using the guide.

9. A game management method according to claim 8, wherein the log-in operation request is transmitted to the game apparatus of the given player using the game server and using the same communication network through which the first player logged-in, and the log-in operation request is receivable by the game apparatus of the given player from said game server through the same communication network through which the first player logged-in and through which the given player can log in, responsive to the log-in operation request.

10. A game management method according to claim 9, wherein the first game apparatus comprises a display device configured to display a game image formed by graphic data, wherein:

the graphic data includes first character data of a first character indicative of a player that is logged-in to the game server and second character data of a second character indicative of a player that is not logged-in to the game server, and the game image includes the first character and the second character respectively formed by the first character data and the second character data.

11. A game management method according to claim 10, wherein the first character data and the second character data indicate logged-in and not logged-in statuses, respectively, by being displayed images that are different from one another.

12. A game management method according to claim 8, wherein the user interface is configured to display a game image formed by graphic data of the game, wherein:

the graphic data includes first character data of a first character indicative of a player being logged-in and second character data of a second character indicative of a player being not logged-in, the game image includes the first character and the second character respectively formed by the first character data and the second character data, and the first character data and the second character data indicate logged-in and not logged-in statuses, respectively, by being displayed images that are different from one another.

13. A game management method according to claim 1, wherein:

a plurality of game apparatuses, including the first and second game apparatuses, are connectable to the game server, each game apparatus in the plurality of game apparatuses is configured to display a game image formed by graphic data on a display device thereof, the graphic data includes first character data of a first character indicative of a player that is logged-in to the game system and second character data of a second character indicative of a player that is not logged-in to the game system, and the game image includes the first character and the second character respectively formed by the first character data and the second character data.

14. A game management method according to claim 13, wherein:

in order to request the second game apparatus to join the game, the first game apparatus is configured to send a joining request to the game server, and said game server is configured to perform functionality including:

identifying the second player based on information included in the joining request; and sending the log-in operation request to the second game apparatus of the identified second player, and said second game apparatus is configured to perform functionality including:

displaying, when the log-in operation request information is received, a calling screen including a menu item enabling the second player to indicate whether the game is to be started for the second game apparatus; and sending a log-in request to said game server based on user input made with respect to the menu item.

15. A game management method according to claim 13, wherein:

in order to request the second game apparatus to join the game, the first game apparatus is configured to send a joining request to the game server, and wherein said game server is configured to perform functionality comprising:

identifying the second player based on information included in the joining request; and sending a mail to request a log-in operation to the second game apparatus of the identified second player.

16. A game management method according to claim 1, wherein the players are registered in said game server in advance of the game.

17. A game management method according to claim 1, wherein the information identifying the second player is transmittable to said first game apparatus player, and the log-in operation request is transmittable to the second game apparatus, via said game server and over the same communication network through which the first game apparatus logged-in.

18. A game management method according to claim 17, wherein the communication network is an IP-based network and the log-in operation request is sent in an electronic mail transmission over the IP-based network.

19. A game management method according to claim 1, wherein the user input is a first selection signal indicative of the first player having selected the second player.

20. A game management method according to claim 1, wherein the transmitting operations are performed within one game application.

21. A game management method according to claim 1, wherein the user interface is integrated in a game world.

22. A game management method according to claim 1, wherein an email message for the second game apparatus of the second player is displayable to the second player via a user interface integrated with a game world of the game.

23. A game server which provides a game for a first game apparatus that is logged-in through a communication network, said first game apparatus being of a first player out of a plurality of players that are registered in said game server, wherein for each player first transmission identifying information indicating whether log-in operation requests are transmittable to the respective player is registerable with the game server, the game server comprising:

at least one processor coupled to a memory; and
a transceiver;
wherein the at least one processor is configured to cooperate with the transceiver and control the game server to at least:

transmit to said first game apparatus information identifying a second player out of the plurality of players that is not logged-in;

transmit, in response to user input on said first game apparatus requesting the second player to log-in, a log-in operation request to a second game apparatus of the second player, conditioned on any first transmission identifying information associated with the second player registered with the game server indicating that log-in requests for the second player are transmittable, the user input being received on said first game apparatus via a user interface that is displayed during a game play mode of the game; and return a first message to said first game apparatus without transmitting the log-in operation request to said second game apparatus, conditioned on any first transmission identifying information associated with the second player registered with the game server indicating that log-in requests for the second player are not transmittable.

24. A game server according to claim 23, wherein the at least one processor is further configured to control the game server to at least:

transmit to the first game apparatus information identifying a given player that is registered in said game server but that is not logged-in, the information identifying the given player being displayable via the user interface on the first game apparatus in the form of a guide that is configured to enable the first player to select the given player based on the displayed information identifying the given player; and transmit a log-in operation request to the game apparatus of the given player in response to a selection of the given player by the first player using the guide.

25. A game server according to claim 23, wherein the log-in operation request is transmitted to the second game apparatus in response to a selection signal for selecting the second player being received from said first game apparatus, such that the log-in operation request is receivable by the second game apparatus from said game server and from said communication network.

26. A game server according to claim 23, wherein the information identifying the second player and the log-in operation request are transmitted without having to switch between applications.

27. A game system to which a plurality of game apparatuses can log-in through a communication network, the plurality of game apparatuses belonging to respective registered game players, the game system comprising:

a game server that provides a game for game apparatuses that are logged-in through the communication network, wherein for each player first transmission identifying information indicating whether log-in operation requests are transmittable to the respective player is registerable with the game server;

a first game apparatus that is logged-in through the communication network, said first game apparatus being of a first player and comprising an integrated user interface through which the game is playable and being configured to receive user input indicating that a request for another player to log-in should be sent; and a second game apparatus that is not logged-in through the communication network, said second game apparatus being of a second player;

wherein the game server comprises at least one processor and a transceiver, the game server being operable to at least:

transmit to said first game apparatus information identifying the second player, transmit, in response to user input received through the integrated user interface on said first game apparatus, a log-in operation request to the second game apparatus of the second player, conditioned on any first transmission identifying information associated with the second player registered with the game server indicating that log-in requests for the second player are transmittable, the user input being received on said first game apparatus via a user interface that is displayed during a game play mode of the game, and return a first message to said first game apparatus without transmitting the log-in operation request to said second game apparatus, conditioned on any first transmission identifying information associated with the second player registered with the game server indicating that log-in requests for the second player are not transmittable.

28. A game system according to claim 27, wherein the game server is further operable to at least:

transmit to the first game apparatus information identifying a given player that is registered in said game server but that is not logged-in, the information identifying the given player being displayable via the user interface on the first game apparatus in the form of a guide that is configured to enable the first player to select the given player based on the displayed information identifying the given player; and transmit a log-in operation request to the game apparatus of the given player in response to a selection of the given player by the first player using the guide.

29. A game system according to claim 27, wherein:

game apparatuses logged-in to the game system can join the game, each game apparatus is configured to display a game image formed by graphic data on a display device associated therewith, the graphic data includes first character data of a first character indicative of the first player that is logged-in to the game system and second character data of a second character indicative of the second player that is not logged-in to the game system, and the game image includes the first character and the second character respectively formed by the first character data and the second character data.

30. A game system according to claim 29, wherein:

in order to request the second game apparatus to join the game, the first game apparatus is configured to send a joining request to the game server, the game server is further operable to identify the second player based the information included in the joining request and transmit, using the transceiver, the log-in operation request to the second game apparatus of the second player identified based on the information included in the joining request, said display device associated with said second game apparatus is configured to display a calling screen display that displays, responsive to the log-in operation request being received by the second game apparatus, a menu item enabling the second player to indicate whether the game is to be started for the second player, and said second game apparatus is controllable to transmit a log-in request to said game server based on user input made with respect to the menu item.

31. A game system according to claim 30, wherein:

said game server is further operable to send map data as the graphic data to the second game apparatus to which the log-in operation request is sent, and the display device associated with said second game apparatus is further configured to display the game image based on the map data.

32. A game system according to claim 30, wherein the log-in operation request information includes information of the first player of the first game apparatus that sent the joining request, and the calling screen includes the first player's information together with the menu item.

33. A game system according to claim 30, wherein said game server stores in advance mail addresses of the game apparatuses, and said first game apparatus is configured to cause the log-in operation request information to be sent to a mail address of the second game apparatus of the second player.

34. A game system according to claim 33, wherein the log-in operation request information is sent via a game dedicated mail message generated by the first game apparatus.

35. A game system according to claim 29, wherein:
in order to request the second game apparatus to join the game, the first game apparatus is configured to send a joining request to the game server, and
said game server is further operable to:
identify the second player based on information included in the joining request; and
send a mail including the log-in operation request for the second game apparatus of the second player identified based on the information included in the joining request.

36. A game system according to claim 35, wherein said second game apparatus is controllable to determine whether the second game apparatus is to join the game when the mail is received.

37. A game system according to claim 29, wherein the graphic data is transmittable from said game server to said game apparatuses.

38. A game system according to claim 29, wherein the first character data and the second character data indicate logged-in and not logged-in statuses, respectively, by being displayed images that are different from one another.

* * * * *